(12) United States Patent
Chanda

(10) Patent No.: US 9,965,526 B1
(45) Date of Patent: May 8, 2018

(54) DATA MINING FOR MULTIPLE ITEM COMPARISONS

(71) Applicant: Amazon Technologies, Inc., Seattle, WA (US)

(72) Inventor: Gaurav Chanda, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 341 days.

(21) Appl. No.: 14/738,081

(22) Filed: Jun. 12, 2015

(51) Int. Cl.
*G06F 17/30* (2006.01)

(52) U.S. Cl.
CPC .. *G06F 17/30539* (2013.01); *G06F 17/30572* (2013.01)

(58) Field of Classification Search
CPC ............... G06F 17/30572; G06F 17/30539
USPC ................................................. 707/722, 776
See application file for complete search history.

(56) References Cited

U.S. PATENT DOCUMENTS

| | | | |
|---|---|---|---|
| 6,912,505 B2 * | 6/2005 | Linden | G06Q 30/02 705/14.53 |
| 7,321,892 B2 | 1/2008 | Vadon et al. | |
| 7,680,703 B1 | 3/2010 | Smith | |
| 7,870,031 B2 * | 1/2011 | Bolivar | G06Q 30/02 705/26.1 |
| 8,117,085 B1 * | 2/2012 | Smith | G06Q 30/0629 705/26.7 |
| 8,234,183 B2 | 7/2012 | Smith | |
| 9,552,603 B1 * | 1/2017 | Chanda | G06Q 30/0631 |
| 2007/0150365 A1 * | 6/2007 | Bolivar | G06Q 30/02 705/26.61 |
| 2012/0158552 A1 * | 6/2012 | Smith | G06Q 30/0629 705/27.2 |
| 2013/0144684 A1 * | 6/2013 | Lee | G06Q 30/0201 705/7.29 |

\* cited by examiner

*Primary Examiner* — Phong H Nguyen
(74) *Attorney, Agent, or Firm* — Kilpatrick Townsend & Stockton LLP

(57) ABSTRACT

Techniques for determining multiple item comparisons may be provided. For example, a system may monitor user interaction of a plurality of users that includes viewing and ordering items. The system may determine one or more items that compete, such that ordering a first item in the competing category of items lowers a probability that the user will also order a second item. The system may determine a subset of the competing items and providing information about the comparison and/or items for presentation to a user.

20 Claims, 13 Drawing Sheets

DATA MINING FOR MULTIPLE ITEM COMPARISONS

BACKGROUND

A variety of data mining methods exist for automatically detecting behavioral relationships between items stored or represented in a data repository. For example, in the context of an electronic catalog of items, data mining processes are commonly used to identify items that tend to be viewed, purchased, downloaded, or otherwise selected in combination. Different types of item relationships may be detected based on different types of user activity. For instance, a pair of items, A and B, may be identified as likely substitutes if a relatively large number of those who view A also view B during the same browsing session. Items C and D, on the other hand, may be identified as likely being complementary of each other if a relatively large number of those who purchase C also purchase D.

The item relationships detected using such processes may be exposed to users to assist users in identifying and selecting items of interest. For example, in some electronic catalog systems. When a user views an item, the user is informed of other items that are commonly viewed or bought by those who have viewed or purchased this item. Although this type of data assists the user in identifying a set of candidate items from which to select (e.g., a set of consumer electronics products with similar features), it generally does not help the user discriminate between these candidate items. Thus, the user typically must rely solely on the descriptions of the candidate items, including any user ratings and reviews, in making a purchase decision.

The need for users to more effectively identify and select between alternative items also arises in a variety of other contexts. For example, in a social networking system, a user may wish to identify a set of users that satisfy particular criteria, and to then select a particular user with which to establish a connection or a communication session. As another example, a user may wish to identify RSS (Really Simple Syndication) or news feeds related to a particular topic, and to then select a particular feed to which to subscribe.

A need also exists in the data mining field to more effectively identify items that are useful in combination. Currently, some ecommerce web sites use purchase-based item relationships ("customers who bought A also bought B") to automatically select pairs of items to suggest purchasing in combination. In some cases, however, this process results in poor bundling suggestions.

Embodiments are directed to addressing these and other problems. Other advantages of embodiments will be apparent to one of skill in the art upon reading the detail disclosure.

BRIEF DESCRIPTION OF THE DRAWINGS

FIG. 3 illustrates one example of how the comparison data can be presented via an interactive item comparison page in accordance with at least one embodiment.

FIG. 5 depicts an example user interface for enabling a user to view comparison data that compares a featured item to a newer model in accordance with at least one embodiment.

DETAILED DESCRIPTION OF SPECIFIC EMBODIMENTS

Figure 1:
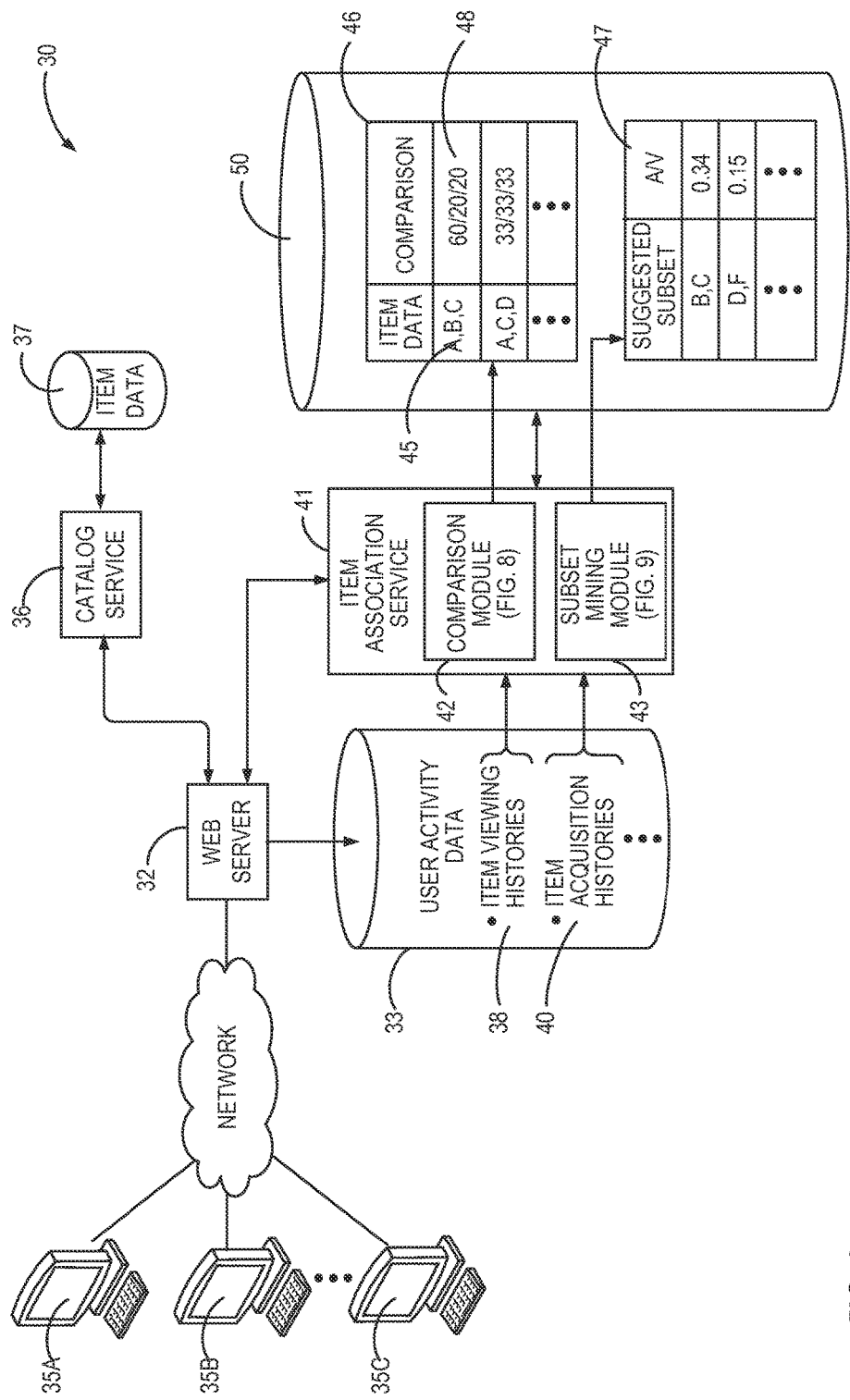
FIG. 1 depicts an example system capable of collecting user activity data, and of mining the collected data to generate comparison data and item bundling suggestions in accordance with at least one embodiment.

Existing data mining methods may limit a data mining analysis to a pair of items, A and B, by removing user activity data and/or potentially distorting a user's actual comparison of items. In actuality, the user may compare a wider range of items (e.g., three to six items, etc.) when making a purchasing decision. Additionally, existing data mining methods may only identify two items that other users have viewed, purchased, downloaded, or otherwise selected in combination (e.g., based at least in part on user activity), without identifying a best seller, new, or popular item that the user is unaware of (e.g., based at least in part on analytics).

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system and/or method for determining multiple item comparisons. The system may include at least one data storage system (e.g., that stores user activity data reflective of catalog item viewing events and catalog item acquisition events of each of a plurality of users of an electronic catalog) and a data mining system operative to analyze the user activity data. The analysis may be based at least in part on generating a subset of catalog items of a plurality of catalog items, the subset of catalog items comprising at least a first catalog item, a second catalog item, and a third catalog item. The analysis may also generate comparison data for the subset of catalog items. The comparison data may at least approximately indicate how frequently users who view the first catalog item, the second catalog item, and the third catalog item select the first catalog item to acquire over the second catalog item and the third catalog item, select the second catalog item to acquire over the first catalog item and the third catalog item, and select the third catalog item to acquire over the first catalog item and the second catalog item. The system may also include a server system operative to incorporate the comparison data into catalog pages of the electronic catalog in association with catalog items to which such comparison data corresponds. The server system can enable users to consider the comparison data in selecting catalog items to acquire.

Embodiments of the present disclosure may be directed to one or more methods implemented by the system as well. For example, the system may monitor user interaction of a plurality of users that includes viewing and ordering items. The system may determine one or more items that compete, such that ordering a first item in the competing category of items lowers a probability that the user will also order a second item. The system may determine a subset of the competing items and providing information about the comparison and/or items for presentation to a user.

In an illustrative example, a subset of users consider three to six items in an online shopping environment (e.g., electronic marketplace, one or more merchant network pages, etc.) before making a purchase (e.g., items A, B, and C). When a new user browses at least some of the same items as the subset of users, the system can identify the current items that are common among the subset of users and the new user (e.g., items A, B, and C), a new item (e.g., item D), and/or a hero item (e.g., item E, which the new user did not identify, but is commonly included with other user's orders) from that subset of users. In some examples, the system may first define the set of things that it makes sense to compare (e.g., three cameras with comparable features rather than a camera, a book about cameras, and gift wrapping with a camera motif, even when the other items were bought during a single shopping session by other users, etc.). The system may propose one or more items in a histogram to the user for easier comparison shopping.

Specific embodiments will now be described with reference to the drawings. These embodiments are intended to illustrate, and not limit, the inventions set forth in the claims. Nothing in this detailed description is intended to imply that any particular feature, characteristic, or component of the disclosed systems and methods is essential.

I. Overview

Data mining systems and methods are disclosed for generating item relationship data, including item comparison data, that may be helpful to users in making item selection decisions. The relationship data may be mined from user activity data (also referred to as "event history data") reflective of item-specific actions performed by users via their computing devices. The items may, for example, be items represented in an electronic catalog, users represented on a social networking site, RSS or other feeds to which users can subscribe, travel destinations represented on a travel agency site, or service providers from which services can be requested. Other examples of item types are described below. The relationship data mined via the disclosed methods may be exposed to users in various ways to assist users in making item selection decisions.

One disclosed data mining method involves generating comparison data for particular subsets of items. In one embodiment, the comparison data indicates, or strongly reflects, the tendency of users who consider more than one item to ultimately select one item over the others. For example, for items A, B, and C, a set of users may initially be identified who both (1) considered A, B, and C, and (2) selected either A or B or C in connection with the consideration of the three items. This may be accomplished by, for example, identifying all browsing sessions in which A, B, and C were considered and only A, B, or C was selected. Once these users or user sessions have been identified, the associated data may be analyzed in aggregate to generate statistical data regarding how frequently one item is selected over the other. For example, a determination may be made that, of the users who considered A, B, and C and selected one over the others, 50% chose A, 40% chose B, and 10% chose C. In some examples, the determination may be made that, of the users who considered A, B, and C, 30% choose A over B and C, 20% choose B over A and C, 15% choose C over A and B, and 10% choose D over A, B, and C (e.g., D may be some other item that is not A, B, or C). The percentages may or may not equal 100%. (See FIG. 8, discussed below, for one example of how comparison data may be generated using sessions.)

Such comparison data may be generated periodically for many different items. This data may be exposed to users in various ways to assist users in selecting particular items. For example, when a user views or otherwise considers item A on a web site or other interactive system, the user may be presented with a display indicating, e.g., that users choose:

B over A and C 33% of the time;

C over A and B 33% of the time; and

Item D over A, B, and C 25% of the time.

As discussed below, the comparison information may alternatively be presented in a different format (e.g., "20 out of 25 customers chose A over B and C"). In some embodiments, comparison data may be presented only for a subset of catalog items in which the items are determined to be likely substitutes for each other. The items may be treated as likely substitutes if, for example, at least some of the following conditions are met: (1) the items are considered during the same browsing session relatively frequently, and (2) those who consider the subset of items very rarely, if ever, ultimately select more than one item from the subset to order (e.g., a user may order an item by adding the item to an electronic shopping cart, providing payment information to a merchant to acquire the item, purchase the item from an electronic marketplace, etc.).

The types of user actions that are treated as "item consideration" and "item selection" can vary widely depending upon the types of items involved, and the types of item-related actions that can be performed, in a given environment. For example, in the context of an electronic catalog of items that can be viewed and purchased, the viewing of an item's detail page may be treated as "consideration" of the item, and the purchase of an item can be treated as "selection" (e.g., an "item detail page" may include a network page that features and displays detailed information about a single item, although the network page may also list other items that are related to the featured item, etc.). In this example, the item detail page for item A, B, and/or C can be supplemented with messaging indicating, e.g., that "X % of those who made a choice between A, B, and C, chose A."

(See FIGS. 2 and 4-6, discussed below, for examples of how this type of data can be incorporated into item detail pages.) As another example, in the context of a video/DVD rental site, the viewing of a video title's detail page may be treated as consideration of the item, and the addition of the video title to a rental queue may be treated as selection of the item. As yet another example, in the context of a download rental service, the viewing of a movie's trailer (e.g., via a television set-top box or via a web browser) may be treated as consideration of the movie, and the renting or downloading of the movie may be treated as selection.

Table 1 below provides some examples of the types of item-specific user actions that may be treated as "consideration" and "selection" in various environments (e.g., one or more interactions between a user device and one or more network pages, which may be stored as interaction data, etc.). These and other types of user actions can be identified from user event histories or clickstreams commonly maintained by various types of interactive systems, including but not limited to server systems that host web sites. Each "consideration" action listed for a given environment can be used with any of the "selection" actions listed for that environment, and all such combinations are contemplated. Numerous other examples will be apparent to those skilled in the art.

TABLE 1

| Environment | Item "consideration" action | Item "selection" action |
|---|---|---|
| E-commerce site that hosts an electronic catalog of items that are available for purchase and/or rental | Viewing an item's detail page<br>Viewing a description of the item elsewhere in the catalog<br>Viewing a media trailer or audio sample | Renting or purchasing the item<br>Adding the item to a shopping cart<br>Adding the item to a wish list<br>Adding the item to a rental queue<br>Downloading the item<br>Bidding on the item |
| Feed aggregation site or system that enables users to view information about, and subscribe to, particular feeds | Viewing feed's description<br>Viewing the feed itself | Subscribing to the feed |
| Social networking system in which the "items" are registered users who have public profile pages, and in which users can send connection requests, and/or initiate communication sessions, with other users | Viewing a user's profile page | Sending a connection request to a user<br>Initiating a communication session with a user |
| Social networking/community site in which users can read about and explicitly join particular user communities | Viewing a description about a particular user community | Joining the community |
| News site in which the items are news articles that can be selected for viewing | Viewing a new article | Viewing the article for an extended time period<br>Adding the article to a personal library<br>Forwarding the article to another user<br>Submitting a comment on the article |
| Travel site in which users can read about vacation spots and make associated travel reservations | Viewing of a travel destination's description | Purchasing an airline ticket to the viewed destination Reserving a car or hotel in viewed destination |
| Internet search engine site in which the items are documents, such as web pages, that are responsive to user's search query | Viewing of a search results page in which the item is included in the search results (note that the items can include sponsored links) | Clicking through from the search results page to the particular item |

Appropriate processing steps can be performed to increase the likelihood that the comparison data is based primarily or exclusively on event sequences in which the users made intentional choices between the items. For example, a clickstream in which a user considered A, B, and C and ultimately selected A or B or C may be disregarded, or accorded lesser weight, if one or more of the following conditions is met: (1) the user did not consider A, B, and C within a selected time interval, such as one hour or one day, (2) the user considered a large number (e.g., ten or more) intervening items between considering A, B, and C; (3) the user made an intervening purchase, or performed another type of ultimate selection action, after considering one item and before considering others, (4) the user's ultimate selection of A, B, or C occurred more than a threshold amount of time, such as one day or one week, after the two items were considered.

Figure 7:
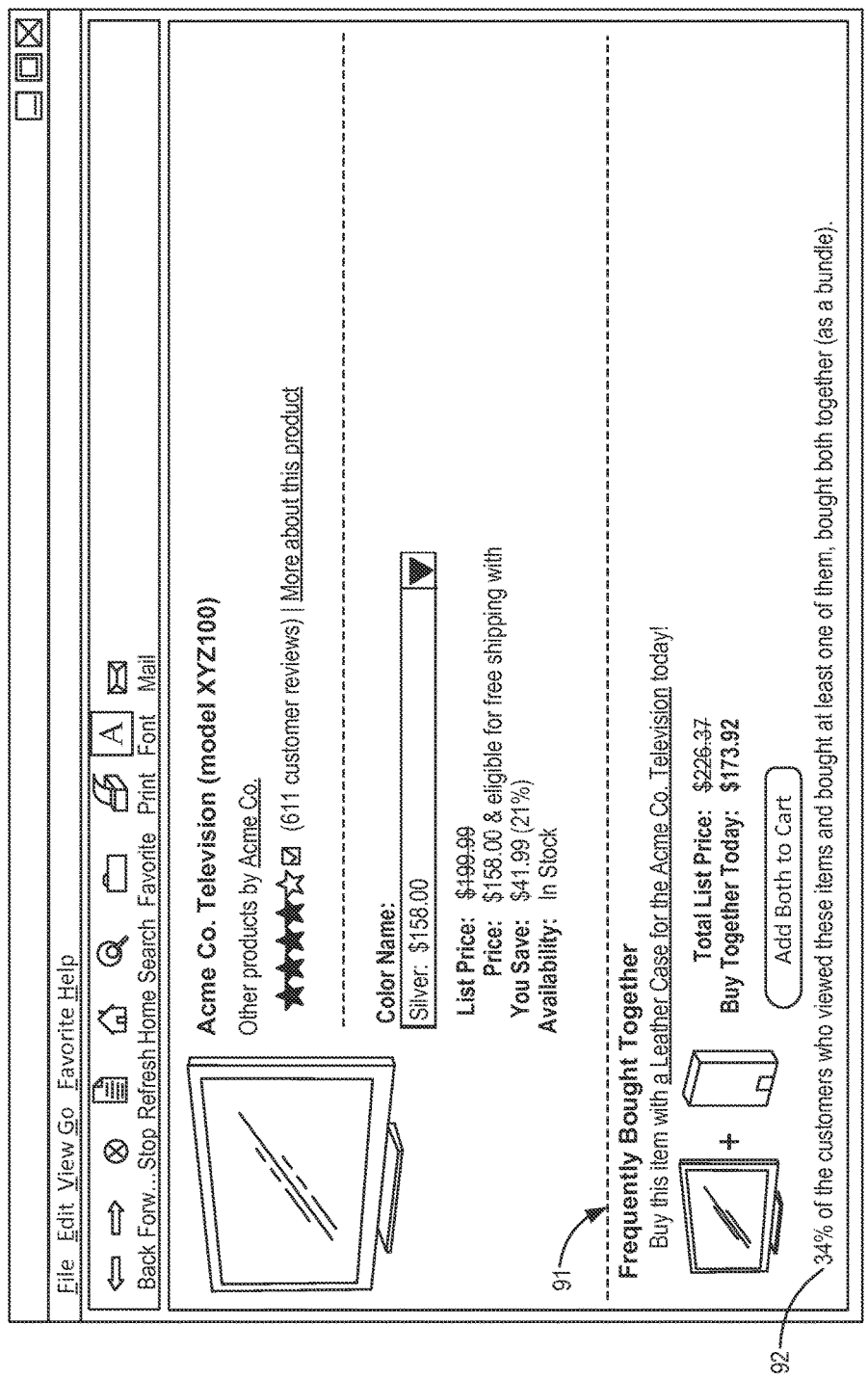
FIG. 7 depicts an example user interface for displaying item bundling suggestions generated by the system of FIG. 1 in accordance with at least one embodiment.
Figure 9:
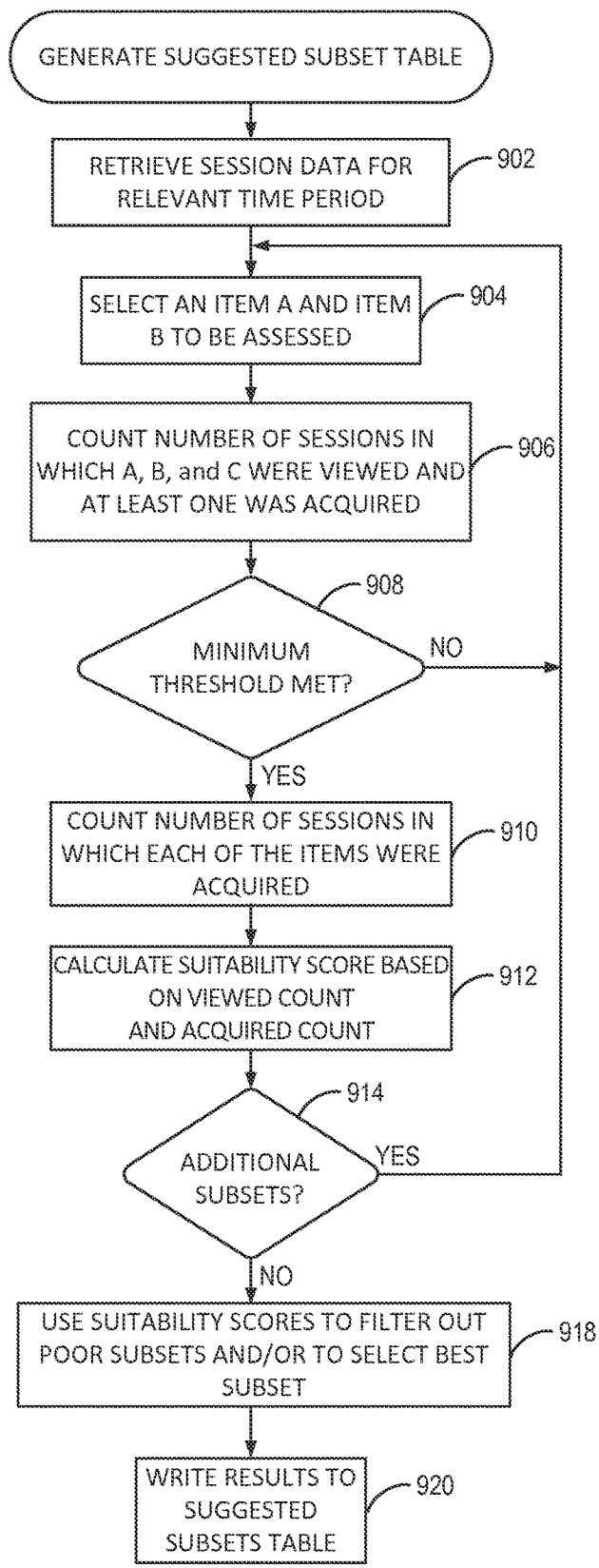
FIG. 9 depicts an example data mining method for using collected user activity data to identify subsets of items to suggest in combination in accordance with at least one embodiment.

Also disclosed is a data mining method for more effectively identifying the items that are well suited for being purchased or otherwise acquired in combination. FIG. 9, discussed below, illustrates one example of this method. In one embodiment, rather than merely relying on user purchase history data to identify items to suggest, the method uses item viewing histories and item purchase histories in combination. For example, the method may detect that a relatively large number of users who viewed A, B, and C purchased the items together. This statistical information may be exposed to users, and/or may be used to cause the items to be suggested as a bundle. FIG. 7, discussed below, illustrates one example of how a resulting items may be presented together with statistical information.

II. Example System (FIG. 1)

FIG. 1 illustrates one example of a system 30 in which the disclosed data mining methods can be employed, and illustrates components for implementing the data mining methods. In this particular embodiment, the items are catalog items represented in a browsable electronic catalog hosted by an Internet-accessible web site system. As will be apparent, the disclosed data mining methods are not limited to such an environment.

The system 30 includes a web server 32 that generates and serves web pages to computing devices 35 of end users (illustrated as computing devices 35A, 35B, and 35C). The computing devices 35 may, for example, include personal computers, personal digital assistants, mobile phones, set-top boxes for televisions, and other types of devices that run web browser software. The web server 32 may be implemented as any number of physical servers/machines that run web server software.

The web server 32 provides user access to an electronic catalog of items that are available via the system 30 for purchase, rental, or another form of acquisition. The items may, for example, include consumer electronics products, household appliances, book, music and video titles in physical and/or downloadable form, magazine and other subscriptions, software programs, grocery items, and various other types of items that may be found in an electronic catalog. In a typical embodiment, many thousands or millions of unique items are represented in the catalog and/or provided through an electronic marketplace of merchants (e.g., many merchants providing many items, some of which are duplicated and offered through the electronic marketplace, etc.).

Detailed information about each item may be obtained by users by accessing the item's detail page within the catalog. To access an item's detail page in one embodiment, a user may select a description of the item (e.g., on a category page, search results page, or recommendations page) or submit a search query that uniquely identifies the item. The item detail page may provide an option for the user to purchase the item, add the item to an electronic shopping cart, wish list, or rental queue, bid on the item, pre-order the item, and/or perform another type of acquisition-related action.

As depicted in FIG. 1, as users access the web site, various types of user actions are recorded in a repository of user activity data 33 (also referred to as "event data"). For example, each item detail page access event and each item acquisition event (e.g., purchase, rental or license) may be recorded. The events may be captured together with event metadata, such as user identifiers, time/date stamps, session identifiers, etc., that may be used for data mining. The event data may be maintained in any appropriate format or formats (e.g., log files, databases, etc.). In addition, different types of event data may be stored separately from others (e.g., in different databases, records, files, etc.).

The web server 32 generates requested catalog pages dynamically in response to requests from the user devices 35. The item data included in the catalog pages (item description, price, availability, etc.) is retrieved from a catalog service 36, which accesses a repository 37 of item data. The content included in the catalog pages also includes various types of item association data retrieved from an item association service 41. For example, as is known in the art, the web server 32 may supplement item detail pages with lists of related items. These lists may be based on purchase-based associations (e.g., "customers who buy A also buy B and C"), view-based associations (e.g., "customers who view D also view E and F"), and other types of item relationships. The item association data also includes comparison data and suggested subsets of items or bundles, as discussed above. FIGS. 3-7, discussed below, illustrate examples of how various types of item association data, including comparison data and suggested subsets of items, may be incorporated into catalog pages.

Figure 8:
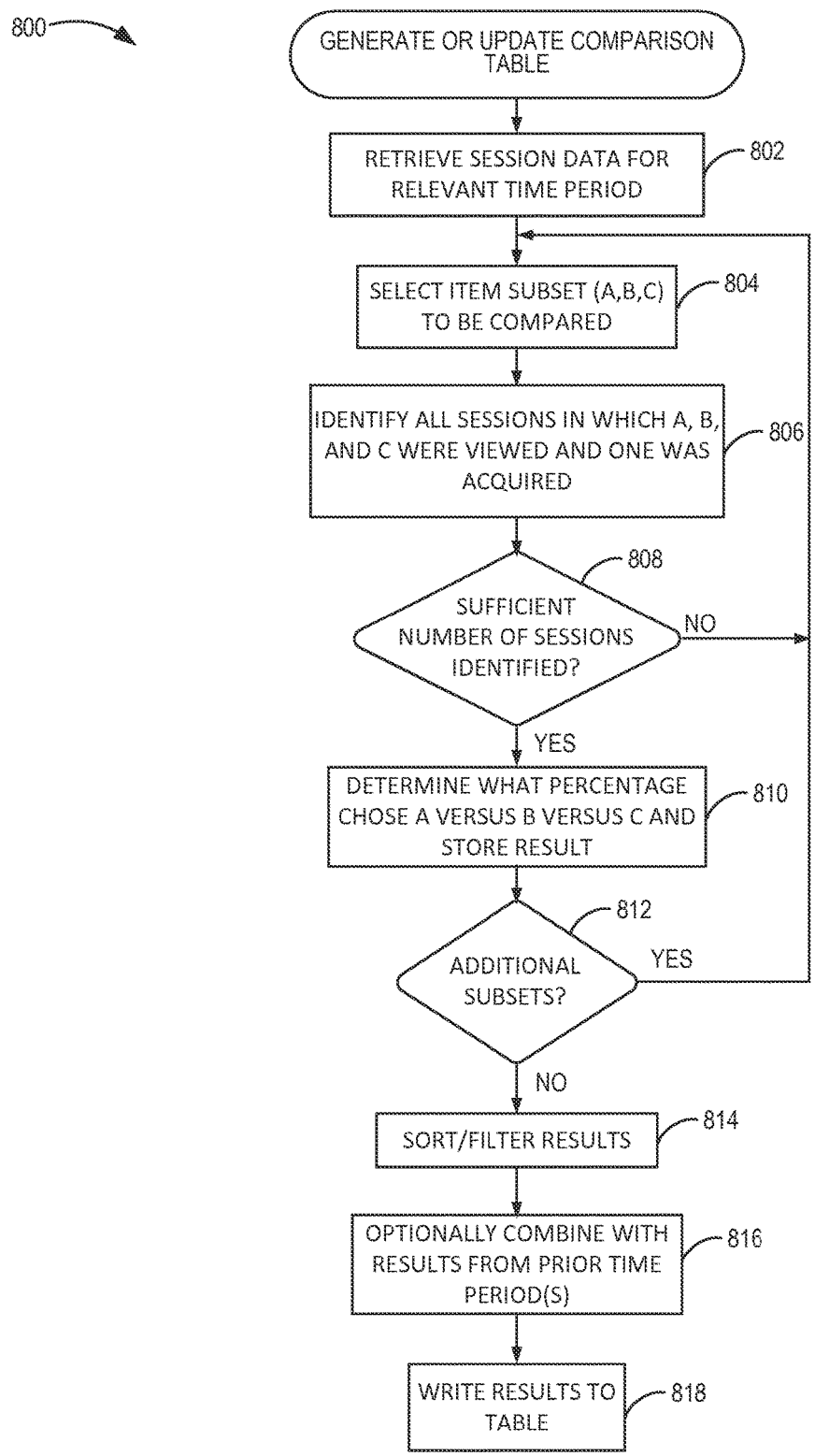
FIG. 8 depicts an example data mining method for generating comparison data from collected user activity data in accordance with at least one embodiment.

As further illustrated in FIG. 1, the item association service 41 includes a comparison program module 42 that generates the comparison data, and includes a subset mining module 43 that identifies suggested subsets of items. Both modules 42 and 43 may operate by analyzing collected event history data, and particularly user-specific item viewing histories 38 and item acquisition histories 40, as shown in FIGS. 8 and 9 and discussed below. In one embodiment, the item viewing histories are based on item detail page visits, and the item acquisition histories may be based on purchases and/or other types of transactions that involve obtaining access to an item. Although both a comparison module 42 and a subset mining module 43 are shown, these modules correspond to distinct features and/or omitted in some embodiments.

The comparison module 42 updates an item comparison table 46 stored in a database, data store, or other data repository 50. This table 46 stores the comparison data for specific subsets of items. For example, the first entry (shown as a row) in this table 46 corresponds to the subset of items (A, B, C) 45, and stores the comparison data 48 (depicted as percentage values totaling 100%). In this example, the comparison data reveals that approximately 60% of the users who have viewed the subset of items, and have selected one item over others, have selected A over B and C. Although each entry depicted in FIG. 1 corresponds to a particular subset of items, a table format can be used in which a single entry contains data for multiple comparisons.

The comparison data may be generated based on item viewing histories and item acquisition histories collected over a selected time period, such as one day, one week, one year, or since inception. The table entries may be updated periodically (e.g., hourly, daily, or as relevant events occur) to reflect newly collected event data. The comparison analysis may optionally be performed such that greater weight is given to data collected from the most recent time periods. For example, an exponential decay algorithm may be used in which the amount of weight given to collected event data decays with time. With this approach, the comparison data can reflect the current preferences of users.

The comparison data values may be displayed in the catalog in association with specific items to assist users in making informed item selection decisions. For example, while viewing the item A, the user may be presented with messaging indicating that "65% of those who choose between items A, B, and C, choose item B." Thus, in addition to being informed of other items that are similar or related to the item selected for viewing, the user is provided with data that assists the user in selecting between the various related items. This data may allow the user to rely on the research conducted by prior users who considered the items being compared.

In some embodiments, the comparison table may include subsets of items when one or more of the following criteria are met: (1) the percentage of users who purchased each of the items is small (e.g., less than 0.5% of those who purchased at least one of the subset of items after viewing each of the items in the subset), (2) the items may be included in the same item category, or (3) the items co-occur relatively frequently in session-specific item viewing histories of users. These criteria may increase the likelihood that the subset of items are considered as substitutes or alternatives of each other. Other criteria, such as similarity in price or physical attributes, may also be considered. The item association service 41 may also refrain from generating or providing comparison data where the collected event data for a given subset of items is insufficient to generate a statistically reliable comparison. For example, a requirement may be imposed that each comparison value must be based on the selections of some threshold number of users or user sessions (e.g., twenty, fifty, one hundred, etc.).

The subset mining module 43 generates or updates a suggested subset table 47. The rows in this table 47 can identify subsets of items that are considered together (e.g., as part of the same transaction or session) relatively frequently by users who consider both of them. The suggested subset table 47 may also include an acquisition/view (A/V) data value that generally represents how frequently users who consider (e.g., view the item detail pages of) the items acquire the items together and/or how frequently users who consider the three items acquire one of the three items, but not the other two. For example, the data value 0.34 may indicate that approximately 34% of the users who have viewed the subset of items during the same session, and have purchased at least one of them, have purchased one of the items from the subset of items. The subset mining module 43 may update the suggested subsets table 47 periodically (e.g., hourly, daily, or as relevant events occur) to reflect newly collected event data. As with the comparison analysis, a decay may be incorporated with the analysis such that greater weight is given to data collected from the most recent time period or periods.

In one embodiment, a subset of items that appears in one of the two tables 46, 47 may not appear in the other. This is because each subset of items in the comparison table 46 can represent three or more items that are substitutes or alternatives for one another, while each subset of items in the suggested subset table 47 can represent three or more items that are complementary of each other.

As discussed below, the processing performed to generate the comparison table 46 may overlap with the processing performed to generate the suggested subset table 47. Thus, although FIG. 1 depicts two data mining modules 42 and 43, a single module or program may be used to concurrently generate both types of data. Further, although two tables 46, 47 are shown in FIG. 1, a single table may be used to store both types of information.

The item association service 41 may include other modules and data structures used to mine and store data regarding other types of item relationships. For example, the service 41 may identify purchase-based item associations and item-viewing-based associations as described in U.S. Pat. No. 6,912,505, which is herein incorporated by reference for all purposes. In addition, the web site system 30 shown in FIG. 1 may include numerous additional services and components for performing various other types of tasks, such as executing acquisition transactions, executing search queries, maintaining user accounts, maintaining user wish lists, shopping carts and/or rental queues, authenticating users, supporting browsing of items by category, etc.

In operation, when a user requests an item detail page via a user computing device 35, the web server 32 sends a service request to the item association service 41 requesting item association data for the corresponding item. In some examples, an item detail page may correspond with a particular catalog item, although one or more related items may also be described on the page as in the examples shown in FIGS. 2, 4 and 5. If this item is part of a subset of items with another item in either the comparison table 46 or the suggested subsets table 47, the service 41 can return the associated table data. For example, if the request is for the detail page for item A, the service 41 may return the first three entries listed in the comparison table 46. In this example, the web server 32 may also access the catalog service 36 to retrieve catalog data for item A (the featured item), and related items B and C, such that appropriate descriptions of these items can be included in the requested page. The web server 32 may alternatively retrieve some or all of the foregoing types of service data from a cache.

Figure 3:
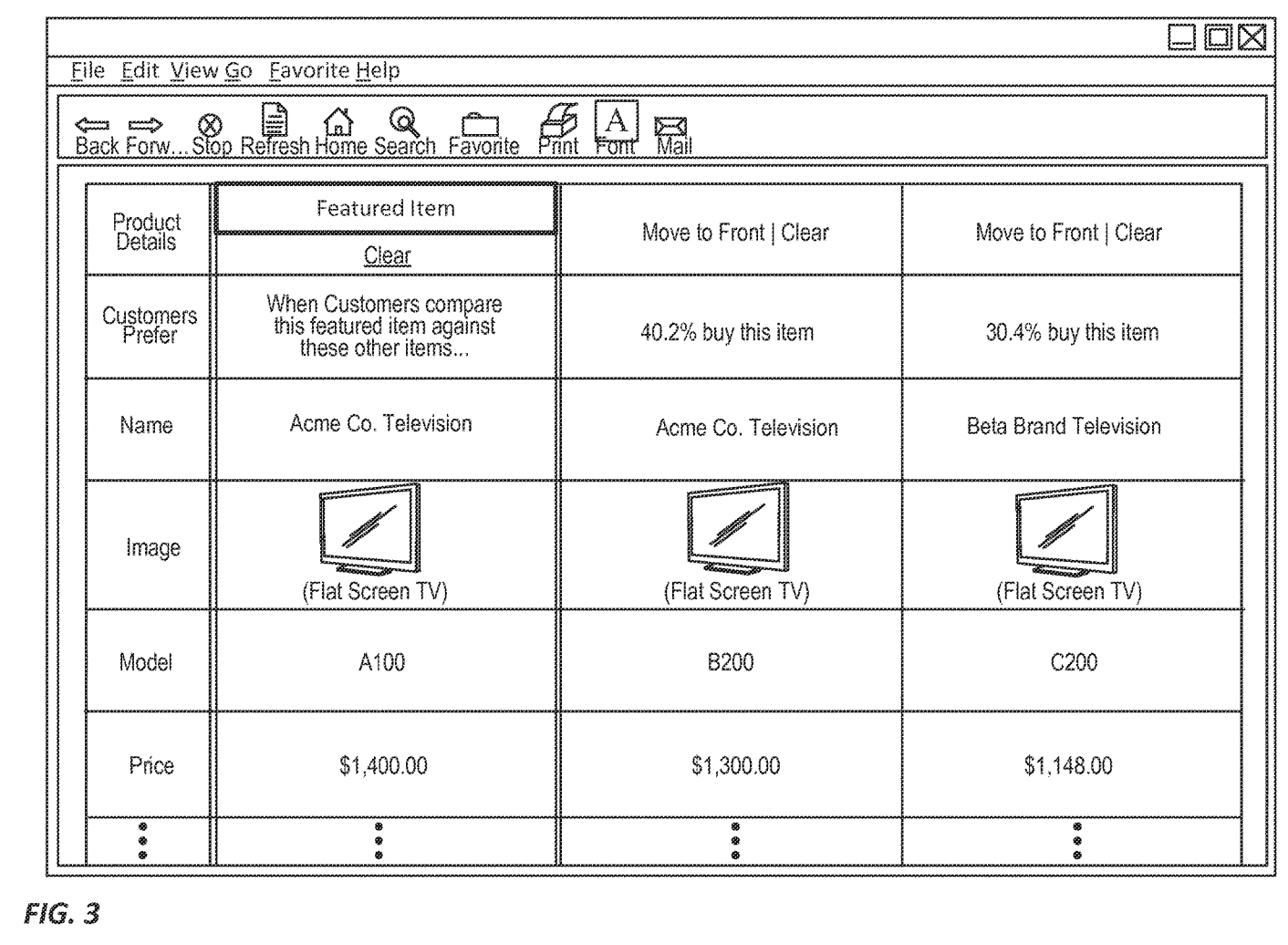

The comparison data and/or suggested subsets may additionally or alternatively be incorporated into other types of catalog pages, including item comparison pages of the type shown in FIG. 3, search results pages, and category pages. In addition, this data may be communicated to users and other entities via email, RSS feeds, responses to web service calls, and other communication mechanisms.

In some cases, multiple versions or variations of a particular item may be treated as the same "item" for purposes of the analyses described herein. For example, the hardcover, paperback, audio, and/or electronic versions of a particular book title may be treated as the same item. As another example, all color and/or memory-size variations of a particular user device model may be treated as the same item. All variations or versions of an item may, but need not, be described on a common item detail page for the item.

The catalog service 36 and the item association service 41 may each be implemented as a respective computer system that executes program code. Each such computer system may include any number of physical computers or machines, and may include computers that are geographically remote from one another. The various program modules may be stored on any type or types of computer storage system or computer-readable medium. The data repositories 33, 37 and 50 shown in FIG. 1 may be implemented as databases, flat file systems, and/or other types of storage systems, and may include magnetic disks, solid-state memories, and/or other types of storage devices. More generally, each of the illustrated components 32, 33, 36, 37, 41 and 50 may be implemented in any appropriate combination of computer hardware and software.

Although the item association service 41 is illustrated as part of a particular web site system 30 in FIG. 1, it could alternatively be implemented as a separate web service that supplies content that is displayed on many different distinct web sites. In such embodiments, the servers of such web sites may send collected user activity data to the item associate service 41 for analysis, and may send web service requests to the item association service to retrieve comparison data. In such multisite embodiments, the comparisons and/or suggested subsets may optionally be generated based on aggregated user activity data collected by a number of distinct and independently operated web sites.

III. Example Web Pages (FIGS. 2-7)

Examples of the types of catalog pages that can be generated by the system 30 will now be described with reference to FIGS. 2-7. To simplify the drawings, some of the information and controls provided with item detail pages (e.g., "add to cart" buttons, customer reviews, etc.) has been omitted.

Figure 2:
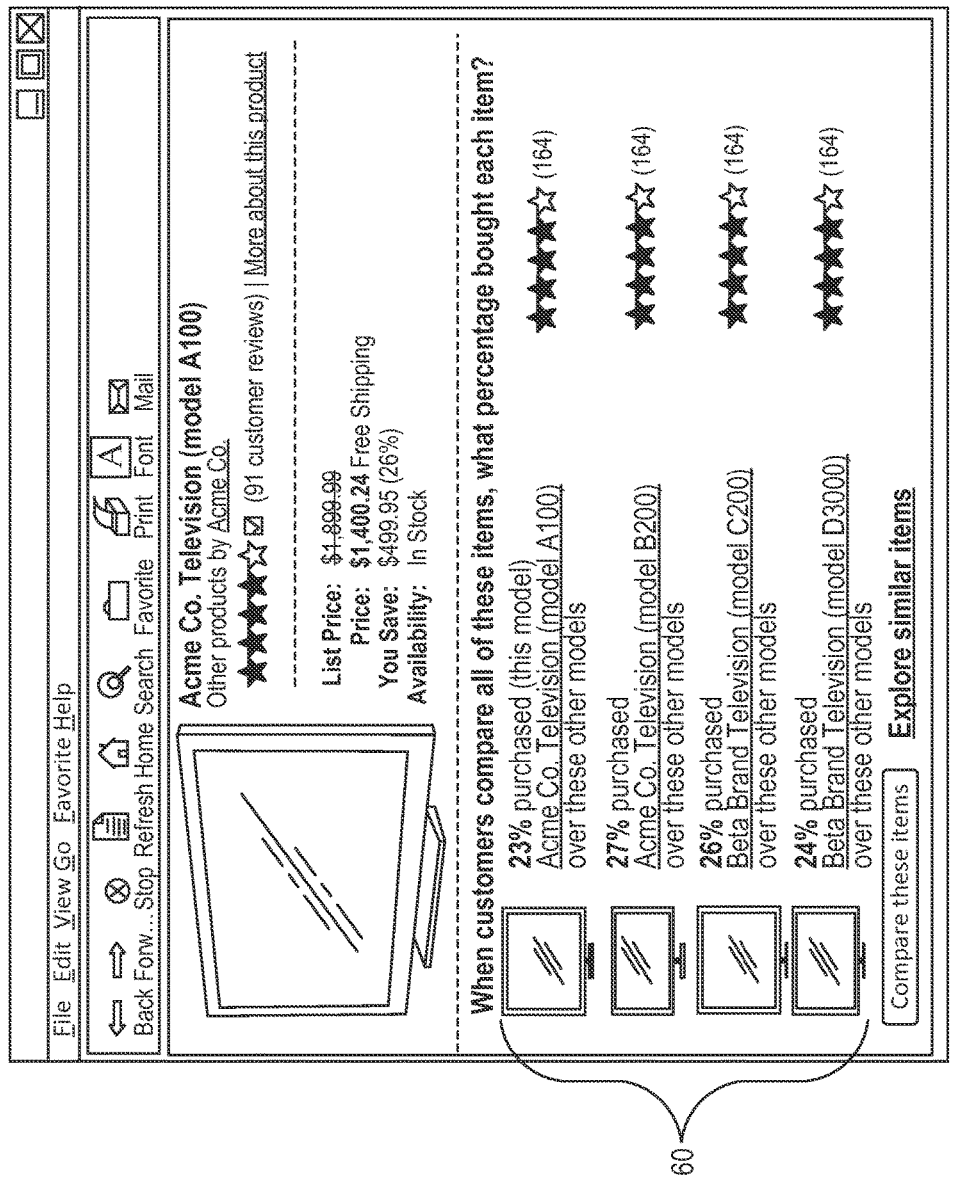
FIG. 2 illustrates one example of how comparison data generated by the system of FIG. 1 can be incorporated into an item detail page of an electronic catalog in accordance with at least one embodiment.

FIG. 2 depicts an illustrative user interface for presenting comparison data on an item detail page. In this example, the item detail page corresponds to a particular item in a television category of the catalog. The illustration include televisions that users frequently compare with the featured item. The associated comparison data values may be displayed as percentage values on the item detail page. Each item in this comparison list 60 may correspond with a respective entry in the comparison table 46.

In addition to informing the user of possible alternatives to the product selected for viewing, the comparison list 60 can provide information about how users choose between the featured item and other items (e.g., percentages, etc.). Each percentage value in the illustrated embodiment may correspond with users who considered the items in the subset of items by viewing their respective item detail pages. For example, the value 23% may include users who, during the relevant time period (1) viewed the detail pages of the featured item (e.g., Acme Co. Television model A100) and a subset of related items (e.g., Acme Co. Television model B200, Beta Brand Television model C200, Beta Brand Television model D3000, etc.), and (2) purchased one of these items and not the others. In another example, the value 27% may include users who viewed the subset of items (e.g., Acme Co. Television model A100, Acme Co. Television model B200, Beta Brand Television model C200, Beta Brand Television model D3000) and purchased one of these items (e.g., Acme Co. Television model B200) but not the other items.

The percentages may or may not add to one-hundred percent (100%). For example, when the users viewed the subset of items and only the subset of items, and purchased one item from the subset of items, the percentages may add to one-hundred percent. In another example, when the users viewed the subset of items in addition to other items outside of the subset of items, the percentages may not add to one-hundred percent. Additional items that would be included in the total number of items views and/or purchases may be removed from the display (e.g., for simplicity, when the percentage of customers that purchase the item is below a threshold, when a threshold number of items are displayed on the page that are associated with a higher percentage than the missing item, etc.).

The percentages may identify how frequently users who consider a subset of items ultimately choose one of the items over the others. In some examples, certain customer choices may be excluded from consideration or given less weight. For example, if the price of one of the two items has changed significantly, purchases made before the price change may be disregarded or given less weight. Changes in other item attributes, such as average customer rating or the availability of customer reviews, may be treated similarly. As another example, any purchases made while one of the items was out-of-stock may be disregarded. Appropriate event metadata may be captured to enable the data mining processes to take these and other factors into consideration.

Although the comparison list 60 is displayed on an item detail page in this example of FIG. 2, the list 60 may alternatively be presented elsewhere, such as in a pop-up window or in a browser toolbar display area. In addition, although the comparison data values are displayed as percentage values in the examples, the raw numbers of users who selected each item may alternatively be displayed (e.g., "57 of the 75 people who selected between A, B, and C, chose B"). Information about the time period involved could also be displayed (e.g., "57 of the 75 people who selected between A, B, and C during the last two weeks, chose B"). In addition, the comparison data could alternatively be presented within a bar chart or pie chart, via color coding or shading, using icons, using different font sizes for different item descriptions, or using any other display format that enables users to assess the degree to which users prefer one item over the other (e.g., histogram, etc.).

FIG. 3 illustrates how the comparison data can be incorporated into an interactive item comparison page. A user may initiate generation of such a page by, for example, selecting a "compare these items" link on an item detail page (e.g., as illustrated with FIG. 2), or by selecting specific items to compare from another type of page. In this example of FIG. 3, the page compares three items, each of which is described in a respective column. In the current view, the item described in the left hand column is selected as the "featured item" for purposes of displaying comparison data. While this item is selected, the other two columns display comparison values (in the "customers prefer" row) indicating how the respective items with the other items. Specifically, the page reveals that the item represented in the middle column (model B200) is selected over the featured item (model A100) and the item in the right column (model C200) 40.2% of the time; and that the item in the right hand column is selected over the other two items 30.4% of the time.

While viewing the item comparison page of FIG. 3, the user can select one of the "move to front" links to cause a different item to be displayed as the featured item. Upon making such a selection, the comparison data shown in the "customers prefer" row is updated to reflect the selection. For example, if the user selects the right hand item as the featured item, the comparison values in the middle column will be updated to indicate how the item described in the middle column compares to the other items. These updates may be made by client-side coding included in the network page document itself (e.g., by causing different portions of the page to become hidden or visible), or may be made via interactions with the web server. Although three items are depicted in this example, the illustrated feature can also be used where a greater number of items (e.g., 4, 5, 6, etc.) are being compared.

Item comparison pages of the type shown in FIG. 3 can also be used in other environments. For example, on a travel network page, an interactive comparison page could be generated that compares multiple travel destinations, and which displays comparisons of these destinations.

Figure 4:
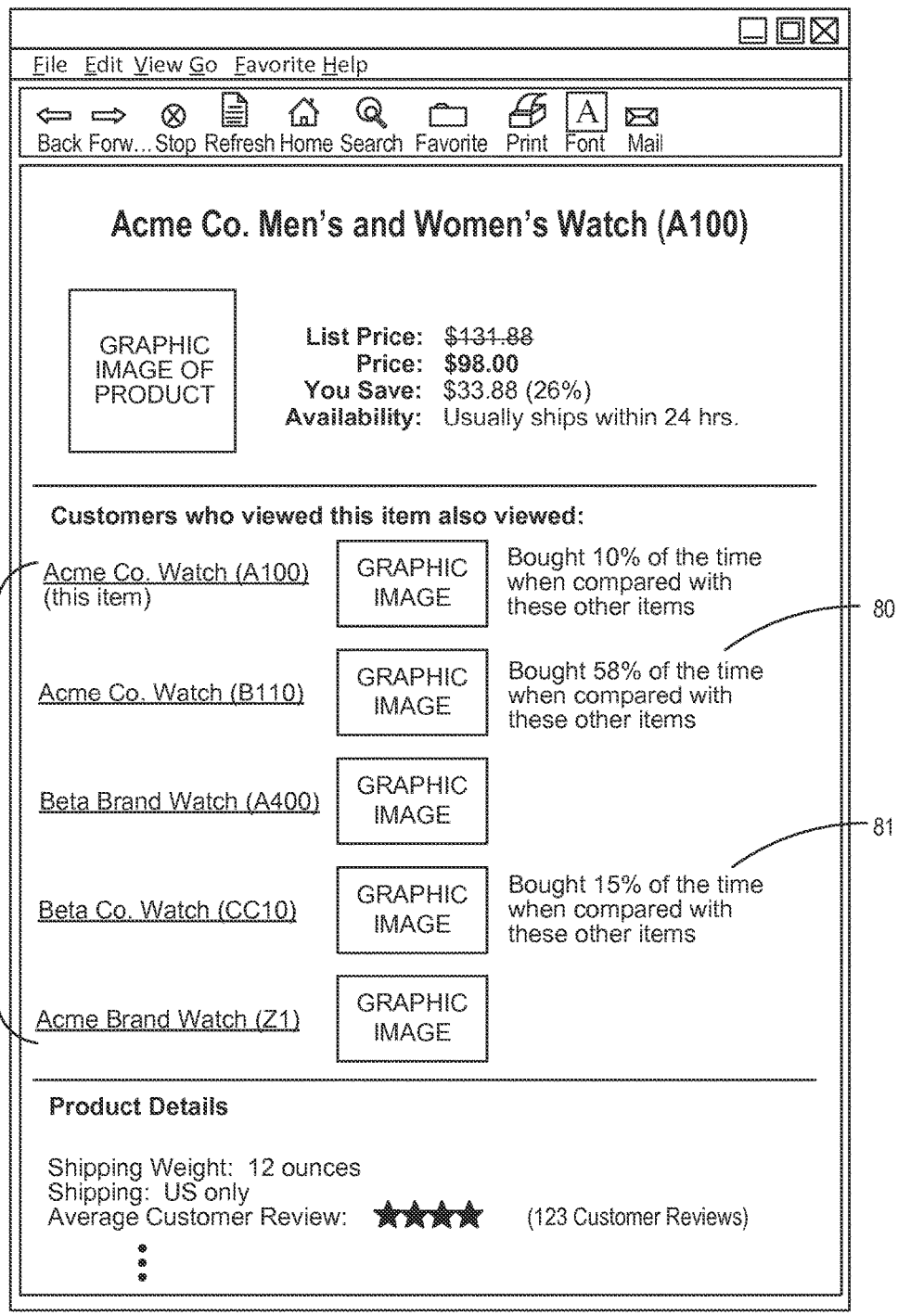
FIG. 4 illustrates another example of how the comparison data can be presented on an item detail page in accordance with at least one embodiment.

FIG. 4 illustrates another example of how the comparison data can be incorporated into an item detail page. In this example, the network page includes a list 70 of five comparable items that are commonly viewed by those who view the featured item ("Acme Co. Men's and Women's Watch (A100)"). This list 70 may be generated by the item association service 41 based on co-occurrences of items in session-specific item viewing histories of users, as described in U.S. Pat. No. 6,912,505, referenced above. Comparison data 80, 81 is displayed for some subset of these items (e.g., because insufficient behavioral data has been collected to generate reliable comparison data for the others, because displaying the percentages corresponds with a preference to show only the top percentages or some other subset of percentages, etc.). In this example, customers who chose between the subset of items, including the Acme Co. Watch (B110) item, the Beta Brand Watch (A400) item, the Beta Co. Watch (CC10) item, the Acme Co. Watch (Z1) item, and the Acme Co. Men's and Women's Watch item, chose the Acme Co. Watch (B110) item 58% of the time.

To generate a display of the type shown in FIG. 4, the web server 32 may initially send a request to the item association service 41 for a list of the items most commonly viewed in combination with the featured item. Upon obtaining this list, the web server may request comparison data for each of the resulting items. The item association service 41 may alternatively support the ability for the web server 32 to retrieve both types of data (i.e., the view-based related items list 70 and the associated comparison data) via a single service request.

Figure 5:
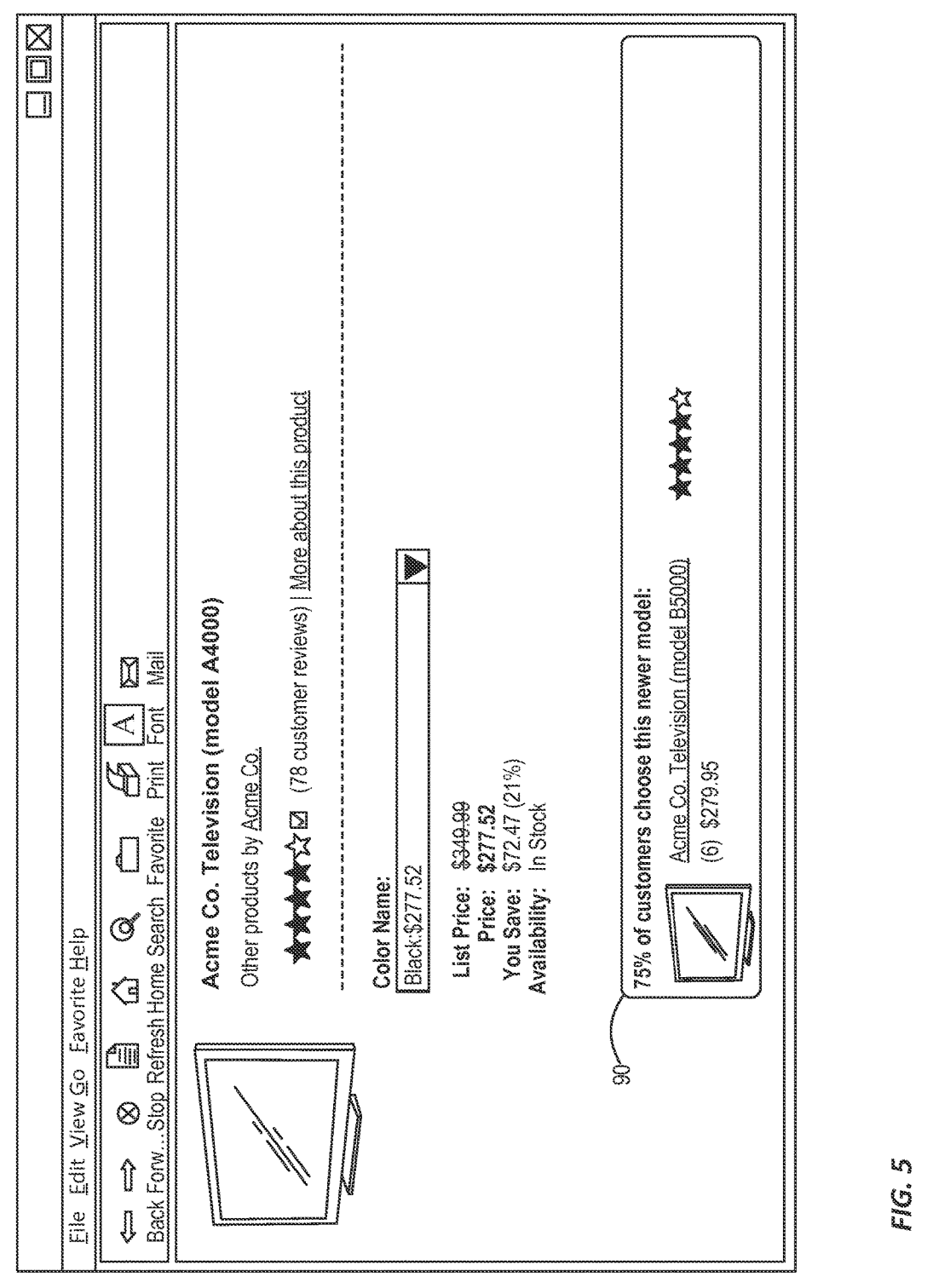

FIG. 5 illustrates another example of how comparison data can be incorporated into an item detail page. In this example, the user interface enables a user to view comparison data 90 that compares the featured item to a newer model and/or other models (e.g., not displayed on the network page). The comparison data 90 reveals that approximately 75% of the buyers who chose between the featured item, the newer model, and/or other models have selected the newer model. The system 30 may automatically incorporate this type of display 90 into an item detail page where, for example, the following conditions are met: (1) data obtained from the catalog service 36 or another source indicates that a newer model corresponding to the featured item is available, and (2) comparison data exists indicating that users who consider a subset of items usually select the newer model over other items.

Figure 6:
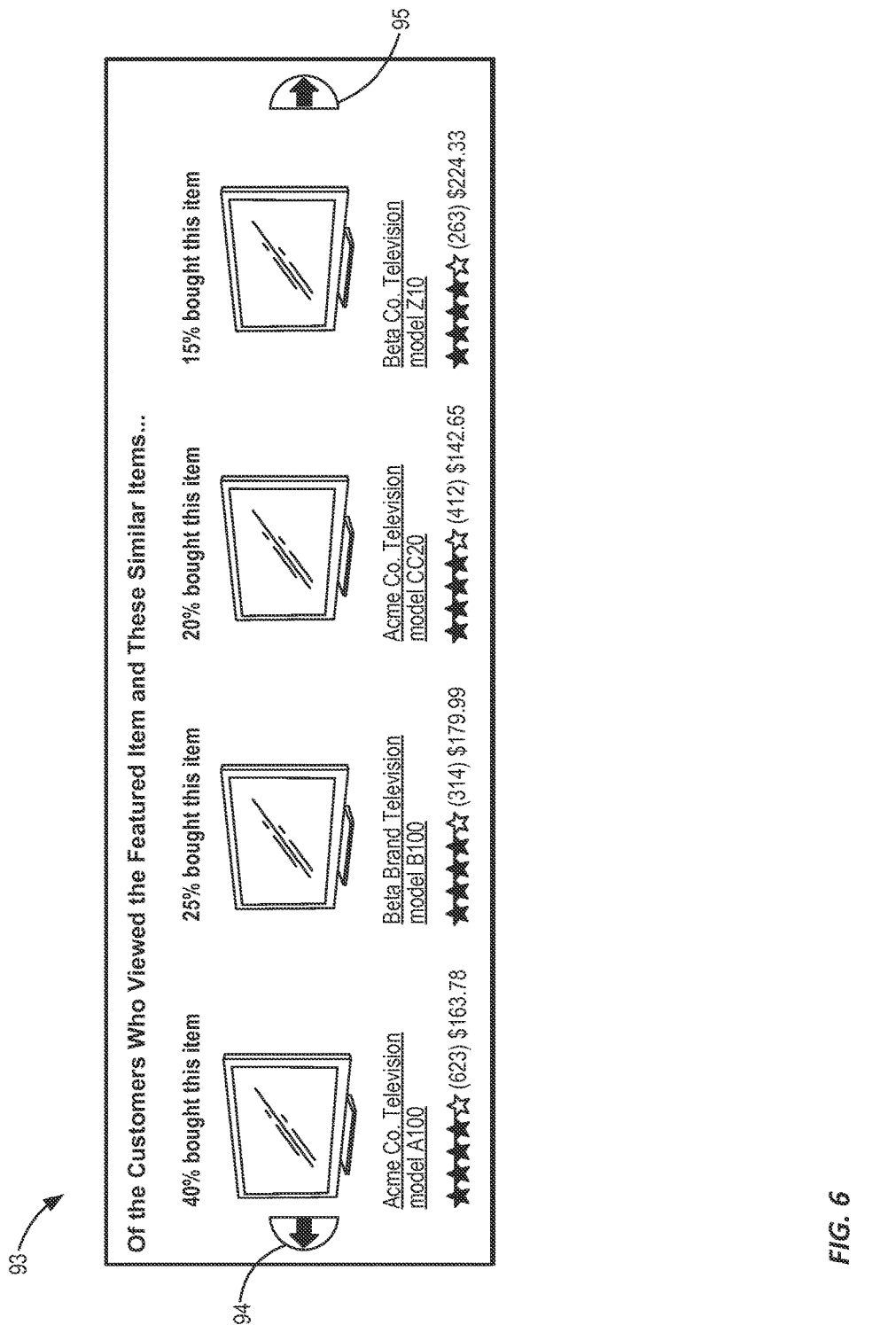
FIG. 6 illustrates another example of how the comparison data may be presented on, or in connection with, an item detail page in accordance with at least one embodiment.

FIG. 6 illustrates yet another example of a portion of a user interface 93 that may be used to incorporate comparison data into an item detail page. The portion of the item detail page describing the featured item is omitted to simplify the drawing. In this example, the user can use the left and right arrow controls 94, 95 to scroll through some or all of the related items for which comparison data is available. The web server 32 may generate this type of display 93 by initially sending a request to the item association service 41 for the comparison data. The web server 32 may then retrieve the illustrated catalog data (photo, name, customer rating and price) for each of the comparable items from the catalog service 36.

As will be recognized, the manner in which comparison data is presented in FIGS. 2-6 is also applicable in other environments, including those listed above in Table 1.

FIG. 7 depicts an illustrative user interface for displaying suggested a subset of items identified by the subset mining module 43 (as illustrated in FIG. 1). In this example, the item detail page is supplemented with a section 91 that suggests purchasing the featured item in combination with an additional item. The additional item in this example is an accessory that is frequently purchased in combination with the featured item by users who compare these items. The display 91 includes messaging 92 indicating that 34% of the customers who viewed this subset of items and bought at least one of the three items bought two or three of the items together. This information, which may be retrieved from the suggested subsets table 47 (FIG. 1), enables users to assess the frequency with which these items have been purchased in combination by users who have compared both. In some embodiments, the messaging 92 may alternatively indicate, e.g., that "34% of the customers who made a purchase after considering these items purchased two or more of them together." In some examples, the purchase of the two items may be considered a suggested subset of items or a bundle (e.g., an item with an accessory for the item, instead of an item and one or more competing items, etc.). As with the percentage values displayed for comparisons, the percentage values (if any) displayed in the messaging 92 may represent approximations.

The subset suggestions may be presented differently than shown in FIG. 7. For example, the percentage information could be omitted, or could be replaced with the raw information from which it was derived (e.g., "18 of the 50 customers who made a purchase after viewing these two items bought both together," or "18 of 50 customers who purchased at least one of these items after considering both of them purchased both together"). Further, the subset suggestions may be displayed on other types of pages, such as search results pages, shopping cart pages, and pages that display personalized recommendations.

IV. Process for Generating Comparison Data (FIG. 8)

FIG. 8 illustrates one embodiment of a process 800 that may be implemented by the comparison module/system 42 (FIG. 1) to generate or update the comparison table 46. This process may be repeated periodically (e.g., once per day) to update or regenerate the comparison table 46 so that the table data reflects the most recent set of user activity data. In this embodiment, the comparison table 46 is generated based on the item viewing histories and item acquisition histories of many users (typically many millions). In one embodiment, the item acquisition histories are purchase histories.

In block 802, the collected event data descriptive of item detail page visits and item acquisitions is retrieved for browsing sessions that occurred over a selected time period. Each session is generally a period or sequence of activity associated with a particular user identifier or user computing device. Any of a variety of known methods may be used to organize user activity data into sessions. For example, a session may begin when a user initiates browsing of a site, and may end when, e.g., the user discontinues browsing for more than a threshold period of time (e.g., ten minutes, one hour or one day), or when the user performs an acquisition or other transaction suggesting that a current task has been completed. As another example, any browsing activity performed by the user during a selected period of time, such as a twenty-four hour period, may be treated as a session regardless of the actions performed during that time period.

The relevant time period for which session data is retrieved in block 802 can vary widely. For example, session data collected over the most recent day, week or year may be retrieved for analysis. In one embodiment, the results of the analysis for the most recent time period are combined with the previously-generated results from one or more earlier time periods, optionally with successively less weight given to results from successively earlier time periods.

In block 804 of FIG. 8, the process identifies a subset of items to be compared. The three items are identified in FIG. 8 by the variables "Item A," "Item B," and "Item C" which represent the unique item identifiers of the items. Any of a variety of methods may be used to select items to be compared. For example, a comparison may be performed of a subset of items that occur in at least one session-specific item viewing history. In some examples, the recorded sessions may be analyzed sequentially in a single iteration, as described below in the section titled "Numerical Example." As another example, a separate analysis may be performed to identify items that co-occur relatively frequently in the session-specific item viewing histories of users (as described in U.S. Pat. No. 6,912,505, referenced above). The resulting item subsets may then be selected for performing comparisons. As another example, a comparison may be performed for possible subsets of items occurring in a bottom-level item category of a hierarchical browse structure. As yet another example, the comparison may be performed for possible items within a full hierarchy of items (e.g., all items contained in an electronics category, all items contained in a television category, which may be included with the electronics category, etc.).

In block 806 of FIG. 8, the session data retrieved in block 802 is analyzed to identify sessions in which the items (A, B, and C) were viewed and one of these items was acquired (e.g., only one, exactly one, more than one, etc.). The addition of an item to a wish list may optionally be treated as an acquisition of the item for purposes this block 806. If the identified number of sessions falls below a selected significance threshold such as twenty, thirty or fifty (block 808), the process skips to the next subset of items. As mentioned above, an item may be treated as "viewed" by a user if the user accessed its detail page. While item detail pages provide a convenient mechanism for identifying items that were viewed/considered, this use of item detail pages is not essential. In some examples, each session identified in block 806 will correspond to a different respective user; where this is not the case, one or more sessions may optionally be discarded such that only a single session remains for each respective user.

In block 810 of FIG. 8, the percentage of users who chose A versus B or C is determined. For example, if eighty sessions were identified in step 806, twenty of which resulted in a purchase of Item A, forty of which resulted in a purchase of Item B, and twenty of which resulted in the purchase of Item C, the resulting percentages for A, B, and C would be 25%, 50%, and 25%, respectively (e.g., and vary for additional items compared, A, B, C, D, E, a hero item, etc.). In some examples, the percentage values may add up to 100% or not add up to 100%. The result of this calculation represents the comparison data for the currently selected subset of items, and may be stored in a temporary table in association with the identifiers of the items. Rather than calculating percentage values, the raw purchase counts for A, B, and C may alternatively be stored. If additional items remain to be analyzed in block 812, the process may be repeated.

In block 814 of FIG. 8, the comparison data for the analyzed subsets of items may be appropriately sorted and filtered. For example, a given Item A may be compared to many different items, only a few of which users frequently choose over A. Thus, all of the comparison results for Item A may be sorted from highest to lowest percentage of selection of B over A and C, and all but those with the highest percentages may be discarded.

In block 816 of FIG. 8, the results are optionally combined with results from prior time periods, such as by taking weighted averages of corresponding comparison values. This step may alternatively be performed prior to step 810 (or any other steps), such that the session count totals from the current period are combined with like session count totals from prior time periods for purposes of step 810. As mentioned above, results from prior time periods may be given less weight (e.g., decreased by a decay value, etc.), such that the final result more heavily reflects the current preferences of users.

In block 818, the results of the process 800 may be written to the comparison table 46 of a database 50 maintained by the item association service 50. The table data may, for example, be stored as B-tree (e.g., to help facilitate rapid look-up, etc.).

As one example of how the process of FIG. 8 may be implemented, the event data collected over a 24-hour period may be retrieved for analysis. The user activity performed by a unique user during that period may be treated as a session. Once the sessions for a given subset of items (A, B, C) have been identified, and the number that chose A versus B versus C has been counted, this information may be combined with like count values from one or more prior 24-hour periods for purposes of calculating the comparison data for the subset of items.

Numerous variations to the process shown in FIG. 8 are possible. As one example, rather than analyzing specific subsets of items sequentially, all of the recorded sessions may be analyzed sequentially in a single pass to generate count values for each subset of items (A, B, C) viewed in at least one session: (1) the number of sessions in which A, B, and C were viewed and at least one was purchased, (2) the number of sessions in which A, B, and C were viewed and in which A but not B or C was purchased, (3) the number of sessions in which A, B, and C were viewed and in which B but not A or C was purchased, (4) the number of sessions in which A, B, and C were viewed and in which C but not A or B was purchased, (5) the number of sessions in which A, B, and C were viewed and in which A and B but not C was purchased, (6) the number of sessions in which A, B, and C were viewed and in which A and C but not B was purchased, (7) the number of sessions in which A, B, and C were viewed and in which B and C but not A was purchased, and (8) the number of sessions in which A, B, and C were viewed and purchased. In some examples, the analysis may also include the number of sessions in which A, B, and C were viewed and a different item was purchased (e.g., Item D, a hero item, etc.), Once all of the recorded sessions have been analyzed, these count values may be used to calculate comparisons for each of the subsets of items. As described below in the section titled "Numerical Example," these same count values may also be used to identify the subsets of items that are best suited to be suggested in combination.

Another variation to the process shown in FIG. 8 is to give different amounts of weight to different users or user sessions for purposes of the calculation in step 810. For instance, the amount of weight given to a session/user may be inversely proportional to (1) the number of intervening items considered by the user between considering item A, item B, and item C; (2) the amount of time that lapsed between the user's consideration of these items, and/or (3) the total length of the session, as measured, e.g., in elapsed time, total number of clicks, total number of items viewed, or a combination thereof. One example of how different amounts of weight can be given to different user event sequences is described in U.S. Pat. No. 7,321,892, which is herein incorporated by reference for all purposes. The amount of weight given to a user's ultimate selection could also be based on one or more of the following: (1) the quantity of information that was available on the item's detail page at the time of the transaction or (2) the reputation of the user as a product reviewer (e.g., "top 100 reviewer"), as measured by the feedback supplied by others on this user's product reviews.

The process may also be modified such that event sequences that span multiple sessions are considered. For example, suppose a user considers items A, B, and C during a given session, and adds one or more items to a shopping cart during this session without making a purchase. If the user subsequently completes a purchase (in a later session) of one of these items and not the others, this later purchase may be treated as if it occurred during the earlier session. In addition, as mentioned above, the process may be modified such that customer choices made prior to significant attribute changes (e.g., a drop in price of one of the items) are excluded from consideration or given less weight. Further, rather than considering item acquisitions as the sole type of "selection" action, multiple different types of selection actions can be recognized. For example, item purchases, shopping cart add events, and wish list add events could all be treated selection events.

As will be apparent, the process depicted in FIG. 8 is not limited to catalog items, but can also be applied to other item types and environments, including those listed earlier in Table 1. In such other environments, block 806 may be modified such that the "viewed" action is replaced with another type of consideration action (e.g., "added to a shopping cart," "ordered," "commented on," etc.), and/or such that the "acquired" action is replaced with another type of ultimate selection action.

V. Process for Identifying Suggested Item Subsets (FIG. 9)

FIG. 9 depicts an illustrative method that may be implemented by the subset mining module 43 (FIG. 1) to identify subsets of items to be suggested in combination. This process may be repeated periodically (e.g., once per day, once per week, as new data becomes available, etc.) to update or regenerate the suggested subsets table 47 to reflect the most recent user activity. Typically, the suggested subset table 47 may be generated based on the collected session data (item viewing histories and item acquisition histories) of many thousands or millions of unique users. The steps of this process generally parallel those of FIG. 8, although the criteria used to assess subsets of items may be different. As will be apparent, the processes of FIGS. 8 and 9 may be appropriately combined into a single process or program that generates both comparison data and suggested subsets of items. In one embodiment, the item acquisition histories analyzed by the process of FIG. 9 are item purchase histories.

In block 902, the process retrieves the session data for the relevant time period, as in FIG. 8. In block 904, the process selects the first subset of items to be assessed as a candidate "suggested subset." Any of a variety of methods may be used to select item subsets to assess. In some embodiments, a "suggested subset" analysis is performed on every item subset for which the items were viewed in at least one session. In another embodiment, the item subsets selected to assess are those having relatively strong purchase-based associations or other acquisition-based associations (i.e., users who acquire Item A also tend to acquire Item B and/or Item C, or all three items together). Although items with strong purchase-based associations are often suitable for being suggested in combination, this is not always the case. For example, a single extremely popular item may tend to co-occur with a less-popular item in the purchase histories of many users, even though the three items have little or no actual relationship.

In block 906, the number of sessions is determined in which the items were viewed and at least one of them was acquired. If this number does not exceed a selected significance threshold, such as thirty, the process discards the current subset of items as a candidate, and skips to the next subset of items (block 908).

In block 910, the number of sessions in which each of the items were acquired is determined. In block 912, the process calculates a suitability score for the current subset of items using the viewed count and the acquired count determined in blocks 906 and 910. In some examples, a ratio may be determined. In some examples, the ratio may comprise a number of users who purchased one of the subset of items by a number of users who viewed the subset of items. As a sample illustration, the ratio for item A is the number of users who bought item A divided by number of users who viewed items A, B, and C and bought A, B, C, or D. The suitability score may correspond with a minimum number of sessions where one or more of the items were viewed (e.g., the item may be viewed at least five times by users to be considered suitable in the overall presentation, etc.).

Once all of the candidate subset of items have been analyzed (block 914), the calculated suitability scores may be used to filter out poor candidates (namely those with relatively low scores), and/or to select the best candidates. For example, for a given item A, any iteration of items B, C, D, E, etc. may be candidates for being in a subset with item A (or at least those having scores that satisfy a minimum). In some examples, the items that are bundled with A (e.g., item A is a television and item B is an accessory for the television instead of a competing item, etc.) may be removed as a poor candidate to consider as part of the subset of items.

The subset of items (e.g., items competing with item A, etc.) may be ranked. For example, the subset of items may be sorted from highest to lowest score (e.g. subset A, B, and C is associated with a score of 50, subset A, B, C, and D is associated with a score of 40, etc. so the presentation may include subset A, B, and C but not subset A, B, C, and D). The subsets of items with the highest suitability scores may then be selected and displayed on A's detail page (e.g., as illustrated with FIGS. 2-7). Additional criteria, such as item price, item availability, and suitability for shipping as a unit, may also be taken into consideration in determining which items to suggest. The additional criteria may, but need not, be incorporated into the suitability score calculation.

In block 920, the selected subset of items may be written to the suggested subsets table 47, optionally together with an A/V data value. The writing of a subset of items to the suggested subsets table 47 may automatically cause that subset to be recommended. Alternatively, a separate component of the system may use the stored A/V values, or other stored suitability score values, to subsequently determine which subsets to recommend.

In some examples, the process of FIG. 9 may favor subsets of items that have high conversion rates. In other processes, purchase histories may be considered without conversion rates of the candidate subsets.

With all of the score generation methods described above, the suitability score may be based on any number of these methods, including (1) a count of the number users or sessions in which one or more items in the subset were purchased, and/or (2) a count of a number of users or sessions in which the subset of items were viewed (or otherwise considered). Thus, the subset's conversion rate (e.g., which is the rate at which those who consider the subset of items and purchase one or more items) may be taken into consideration. Although sessions provide a convenient mechanism for analysis, the analysis may be performed without regard to the particular sessions in which recorded events occurred.

As with the comparison process described in FIG. 8, the results (or interim results) of the process in FIG. 9 may be combined with results from prior time periods. In addition, different sessions could be weighted differently in generating the suitability scores and/or the A/V values. In some embodiments, the process of FIG. 9 may be performed solely to generate statistical data to be displayed with recommendations of particular subsets of items. For example, the subsets of items to be recommended may be selected by an entirely different method, and the process of FIG. 9 may be used to generate corresponding percentage values (e.g., as illustrated with FIG. 7) for enabling customers to assess recommendations.

As with the comparison process of FIG. 8, the process of FIG. 9 may be modified such that the recorded sessions are analyzed sequentially in a single iteration to generate intermediate count values for each subset of items considered together in at least one session. These intermediate count values may then be used to calculate the suitability scores. An example of this approach is illustrated in the numerical example below.

As will be recognized, the methods depicted in FIGS. 8 and 9 may be implemented using fewer or additional steps, and the steps may be performed in a different order than is illustrated. In addition, the item association service 41 described herein is just one type of data mining system in which the disclosed data mining methods can be embodied. The disclosed methods can also be embodied in other types of computer systems (e.g., including systems that do not support service calls, etc.).

VI. Numerical Example

The following example illustrates how the recorded item viewing and purchasing histories of users can be processed on a session-by-session basis to generate a set of count values. These count values can then be used to generate comparison percentages and suitability scores. In this example, the following three user-specific event sequences or sessions are analyzed:

| User | Item | Action |
|---|---|---|
| 1 | A | view |
| 1 | B | view |
| 1 | C | view |
| 1 | B | purchase |
| 1 | C | purchase |
| 2 | A | view |
| 2 | B | view |
| 2 | C | view |
| 2 | A | purchase |
| 2 | C | purchase |
| 3 | A | view |
| 3 | B | view |
| 3 | C | view |
| 3 | B | purchase |
| 3 | C | purchase |

In practice, the number of sessions could be much larger. The goal of the process may be to generate a Counts table that contains the following count values for each subset of items (X, Y, Z) viewed in at least one session:
Views
BoughtItemOtherThanXYZ (by users who viewed X, Y, Z) (e.g., hero item)
BoughtOnlyX (by users who viewed X, Y, Z)
BoughtOnlyY (by users who viewed X, Y, Z)
BoughtOnlyZ (by users who viewed X, Y, Z)
BoughtOnlyXY (by users who viewed X, Y, Z)
BoughtOnlyXZ (by users who viewed X, Y, Z)
BoughtOnlyYZ (by users who viewed X, Y, Z)
BoughtOnlyXYZ (by users who viewed X, Y, Z)
One way to populate this table is to run through all sessions sequentially while updating the table. After processing user 1, the Counts table is as follows:

| Subset | Views | BoughtOnlyX | BoughtOnlyY | ... |
|---|---|---|---|---|
| A | 1 | 0 | 1 | 0 |
| B | 1 | 0 | 1 | 0 |
| C | 1 | 0 | 0 | 1 |

After processing user 2, the Counts table is as follows:

| Subset | Views | BoughtOnlyX | BoughtOnlyY | ... |
|---|---|---|---|---|
| A | 2 | 1 | 1 | 0 |
| B | 2 | 1 | | 1 |
| C | 2 | 1 | | 1 |

After processing user 3, the Counts table is as follows:

| Subset | Views | BoughtOnlyX | BoughtOnlyY | ... |
|---|---|---|---|---|
| A | 3 | 1 | 2 | 0 |
| B | 3 | 0 | 2 | 1 |
| C | 3 | 0 | 1 | 2 |

The count of "users who viewed X, Y, Z and bought at least one of them" can be calculated by combining (e.g., adding, aggregating, etc.) at the least three columns.

Another way of arriving at this final table is to determine the statistics for each user, sort, and then to sum across rows with repeated Subsets.

VII. Additional Systems and Methods

Figure 10:
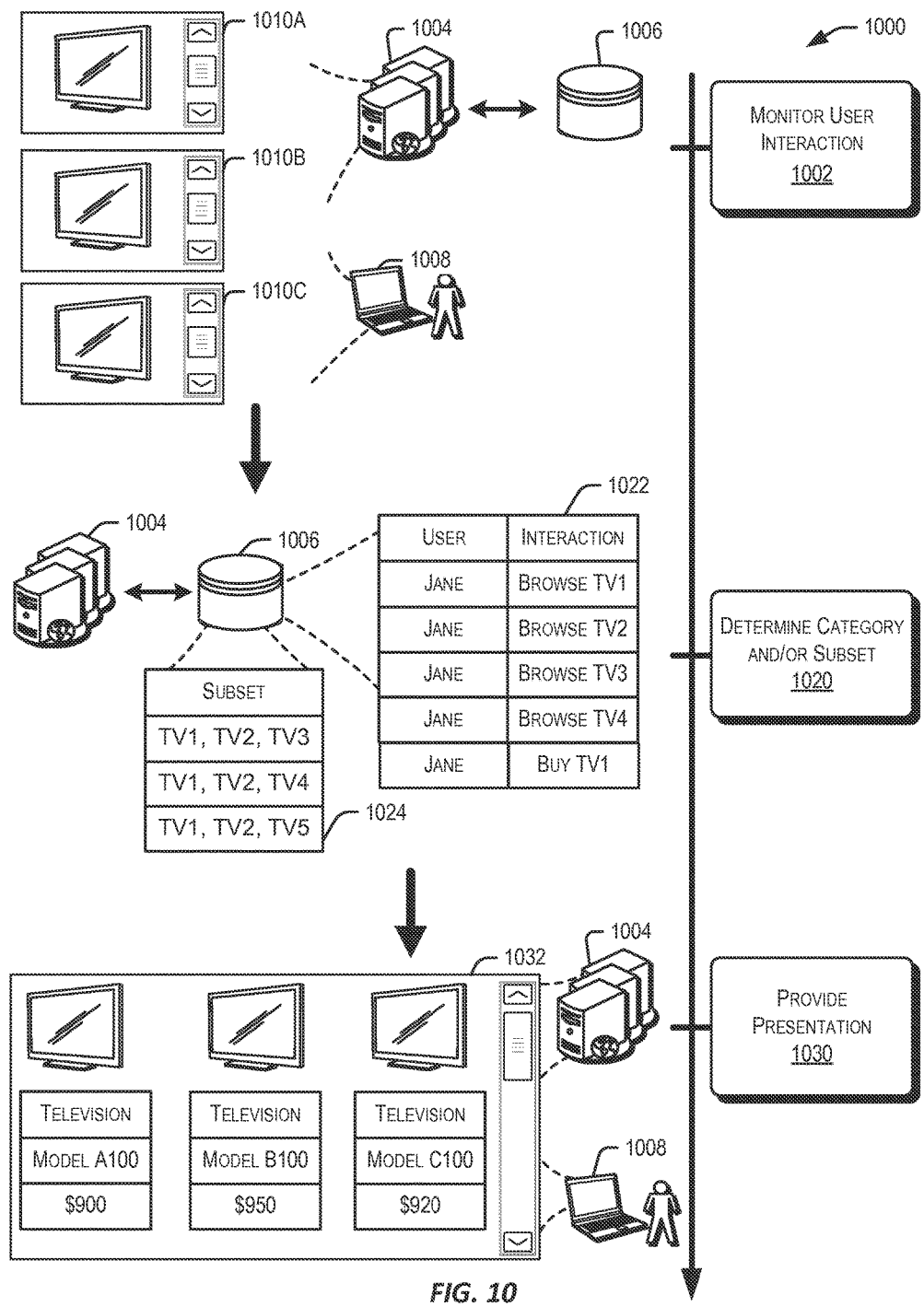
FIG. 10 illustrates an example flow for determining multiple item comparisons described herein, in accordance with at least one embodiment.

FIG. 10 illustrates an example flow for determining multiple item comparisons described herein, in accordance with at least one embodiment. The process 1000 can begin with monitoring user interaction at 1002. For example, a computer system 1004 can interact with a data store 1006, a user device 1008, or one or more network pages 1010 to access interaction data (e.g., illustrated as network pages 1010A, 1010B, 1010C). The one or more network pages 1010 may provide information on one or more catalog items, including a first catalog item provided on a first network page 1010A, a second catalog item provided on a second network page 1010B, and a third catalog item provided on a third network page 1010C. Many other catalog items may be provided by computer system 1004, including a fourth catalog item, a best seller catalog item or hero item (e.g., an item that is purchased in a category more and/or most frequently compared to other items in the category, and may be presented to a user even when the user does not interact with the item, etc.), a new or featured catalog item, or other items discussed herein. The information on one or more catalog items and/or interaction data may be stored with data store 1006 or dynamically received from the one or more network pages 1010. Other types of data may be shared or stored with the data store 1006 without diverting from the scope of the disclosure.

The computer system 1004 may monitor user interactions. For example, as discussed herein, the user interaction may include a consideration (e.g., viewing an item's detail page, viewing a description of an item, viewing a media trailer or audio sample, typing an item description into a search box, browsing through search results after a user submits a search query, etc.) or selection (e.g., renting or purchasing an item, adding an item to a shopping cart or wish list, etc.). The user may choose to compare items on an item detail page (e.g., as illustrated with FIG. 3). In some examples, the user interaction may include clickstream data for one or more users (e.g., with one or more network pages, with an electronic marketplace, etc.).

The computer system 1004 may include an asymmetric similarities engine or other modules discussed throughout the disclosure. The asymmetric similarities engine may monitor user interactions that appear to be unrelated (e.g., users who browsed a first catalog item bought a second catalog item, or users who bought a third catalog item added a fourth catalog item to an electronic shopping cart a month later, etc.). As a sample illustration, a user may view four cameras (e.g., items A, B, C, D). The asymmetric similarities engine can generate the probabilities that users who viewed a particular set of cameras (e.g., A, B, C, D) ultimately acquired one of those items (e.g., A or B or C or D), in some examples, when the interaction between the items seems unrelated (e.g., over an extended time period, during a session, etc.).

In some examples, the user interaction may be identified with an electronic marketplace. For example, the computer system 1004 may provide one or more network pages of items from one or more merchants. The items provided by the merchants may be managed at least in part by the computer system 1004 (e.g., received from a merchant for storage, provided to a user after the user orders the item, etc.). The network pages associated with an electronic marketplace may include item detail pages associated with an electronic catalog of items. In some examples, the electronic catalog may be operated and/or provided at least in part by the electronic marketplace.

The process 1000 may also determine a category and/or subset at 1020. For example, a computer system 1004 may determine a category of items that compete for a user order. The category of items may identify one or more catalog items that users consider (e.g., identified in the interaction data, etc.) prior to selecting an item in the category of items. As a sample illustration, a group of users may consider television1, television2, and television3 prior to purchasing television1 (e.g., see also illustrations with FIGS. 2-7). The items in the competing category of items may be identified by one or more other computer systems or dynamically.

In some examples, the items may compete for a user order. For example, a first catalog item may compete with a second catalog item when a threshold number of users purchase the first catalog item instead of a second catalog item (e.g. more than 40%, etc.). In some examples, a user may consider three or more items, such that ordering a third catalog item in the category of items significantly lowers a probability that the user will also order a second catalog item in the category of items and/or the first catalog item in the category of items.

A subset of competing catalog items may be determined. In some examples, the compared subset of the competing category of items can contain at least three items in the competing category of items (e.g., at least three items, three to five items, no more than six items, etc.). The items may be grouped in a subset when the items are viewed, ordered, acquired, or considered (e.g., and other interactions discussed herein) by the users. In some examples, the subset of competing catalog items may be limited (e.g., based at least in part on computing or scalability limitations, based at least in part on highlighting more relevant information to the user with the other items, based at least in part on increased instances of items that are acquired by previous users when the previous users received additional items in the subset, based at least in part on not overwhelming the user with options, etc.).

The items may be included in the subset of competing catalog items based at least in part on various thresholds. For example, a ratio may be determined and compared with a threshold. The ratio may comprise a number of orders of each item divided by a number of views of the item. In another example, the ratio may comprise a number of adds to an electronic shopping card divided by the number of views of the item. In some examples, the ratio may be determined for the compared subset of items by dividing a number of users who purchased one of the subset of items by a number of users who viewed the subset of items. As a sample illustration, the ratio for item A is the number of users who bought item A divided by number of users who viewed items A, B, and C and bought A, B, C, or D.

The process 1000 may also provide a presentation at 1030. For example, a computer system 1004 may provide instructions or code (e.g., HyperText Markup Language (HMTL), Extensible Markup Language (XML), etc.) to populate a presentation on a network page 1032. The network page 1032 may include one or more items from the compared subset of items, the ratio (e.g., a number of users who purchased one of the subset of items divided by a number of users who viewed a subset of items and purchased at least one of the items, etc.). The presentation may include item data included in one or more catalog pages (item description, price, availability, etc.) and/or retrieved from a catalog service 36 illustrated with at least FIG. 1.

In some examples, the presentation may include a hero item. For example, the interaction data may identify a frequently purchased item that is not included with the user's interaction data (e.g., the user accesses item detail pages for items A, B, C, and D, but item E is a best seller for the category of items, etc.). The hero item may not be included with the interaction data for the user (e.g., with block 1002). In some examples, the hero item may be included as a recommendation and/or included with a recommendations page, as discussed herein.

The presentation may include information other than item data. For example, the network page 1032 may include examples discussed herein, including information about a social network, news articles, airline tickets, search engine results, statistical information, purchase history of a user, and the like.

The presentation may include a histogram. The histogram may include one or more combinations of items that users considered, viewed, and/or acquired (e.g., when the browsing history is similar to other users, etc.). Examples of the presentation are provided throughout the disclosure, including at FIGS. 2-7.

Figure 11:
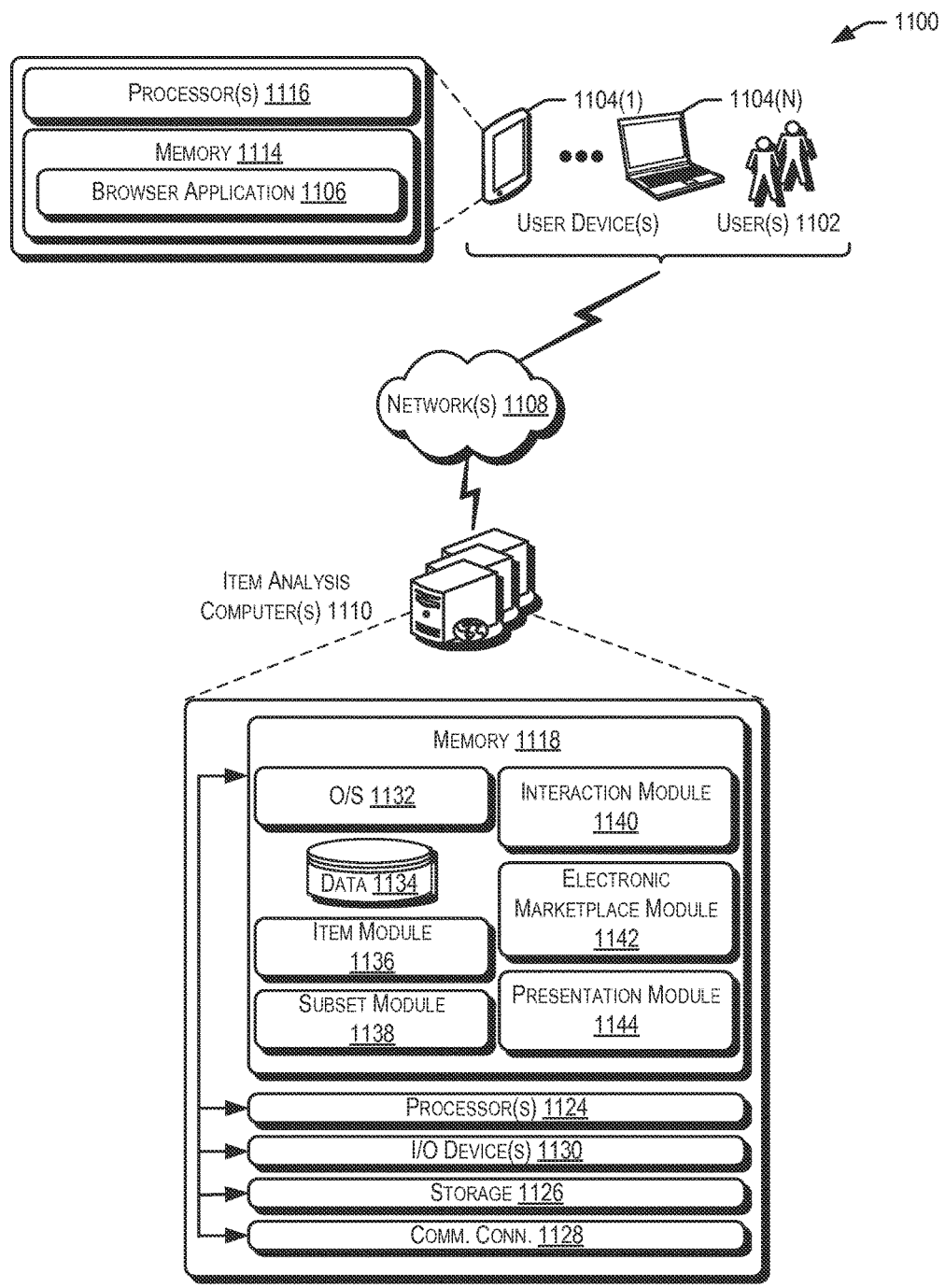
FIG. 11 illustrates an example architecture for determining multiple item comparisons described herein that includes an item analysis computer and/or a user device connected via one or more networks, in accordance with at least one embodiment.

FIG. 11 illustrates an example architecture for determining multiple item comparisons described herein that includes an item analysis computer and/or a user device connected via one or more networks, in accordance with at least one embodiment. In architecture 1100, one or more users 1102 (i.e., web browser users) may utilize user computing devices 1104(1)-(N) (collectively, user devices 1104) to access an application 1106 (e.g., a web browser), via one or more networks 1108. In some aspects, the application 1106 may be hosted, managed, and/or provided by a computing resources service or service provider, such as by utilizing one or more service provider computers and/or one or more item analysis computers 1110. The one or more item analysis computers 1110 may, in some examples, provide computing resources such as, but not limited to, client entities, low latency data storage, durable data storage, data access, management, virtualization, cloud-based software solutions, electronic content performance management, etc. The one or more item analysis computers 1110 may also be operable to provide web hosting, computer application development, and/or implementation platforms, combinations of the foregoing, or the like to the one or more users 1102. The one or more item analysis computers 1110, in some examples, may help determine a subset of items to compare and present to one or more user devices 1104.

In some examples, the networks 1108 may include any one or a combination of many different types of networks, such as cable networks, the Internet, wireless networks, cellular networks and other private and/or public networks. While the illustrated example represents the users 1102 accessing the application 1106 over the networks 1108, the described techniques may equally apply in instances where the users 1102 interact with the item analysis computers 1110 via the one or more user devices 1104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 1106 may allow the users 1102 to interact with a service provider computer, such as to access web content (e.g., web pages, music, video, etc.). The one or more item analysis computers 1110, perhaps arranged in a cluster of servers or as a server farm, may host the application 1106 and/or cloud-based software services. Other server architectures may also be used to host the application 1106. The application 1106 may be capable of handling requests from many users 1102 and serving, in response, various item web pages. The application 1106 can provide any type of website that supports user interaction, including social networking sites, online retailers, informational sites, blog sites, search engine sites, news and entertainment sites, and so forth. As discussed above, the described techniques can similarly be implemented outside of the application 1106, such as with other applications running on the user devices 1104.

The user devices 1104 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 1104 may be in communication with the item analysis computers 1110 via the networks 1108, or via other network connections. Additionally, the user devices 1104 may be part of the distributed system managed by, controlled by, or otherwise part of the item analysis computers 1110 (e.g., a console device integrated with the item analysis computers 1110).

In one illustrative configuration, the user devices 1104 may include at least one memory 1114 and one or more processing units (or processor(s)) 1116. The processor(s) 1116 may be implemented as appropriate in hardware, computer-executable instructions, firmware, or combinations thereof. Computer-executable instruction or firmware implementations of the processor(s) 1116 may include computer-executable or machine-executable instructions written in any suitable programming language to perform the various functions described. The user devices 1104 may also include geo-location devices (e.g., a global positioning system (GPS) device or the like) for providing and/or recording geographic location information associated with the user devices 1104.

The memory 1114 may store program instructions that are loadable and executable on the processor(s) 1116, as well as data generated during the execution of these programs. Depending on the configuration and type of user device 1104, the memory 1114 may be volatile (such as random access memory (RAM)) and/or non-volatile (such as read-only memory (ROM), flash memory, etc.). The user device 1104 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1114 may include multiple different types of memory, such as static random access memory (SRAM), dynamic random access memory (DRAM), or ROM.

Turning to the contents of the memory 1114 in more detail, the memory 1114 may include an operating system and one or more application programs or services for implementing the features disclosed herein, such as via the browser application 1106 or dedicated applications (e.g., smart phone applications, tablet applications, etc.). The browser application 1106 may be configured to receive, store, and/or display a website or other interface for interacting with the item analysis computers 1110. Additionally, the memory 1114 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 1102 provided response to a security question or a geographic location obtained by the user device 1104.

In some aspects, the item analysis computers 1110 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the item analysis computers 1110 may be in communication with the user devices 1104 and/or other service providers via the networks 1108, or via other network connections. The item analysis computers 1110 may include one or more servers, perhaps arranged in a cluster, as a server farm, or as individual servers not associated with one another. These servers may be configured to implement the content performance management described herein as part of an integrated, distributed computing environment.

In one illustrative configuration, the item analysis computers 1110 may include at least one memory 1118 and one or more processing units (or processor(s)) 1124. The processor(s) 1124 may be implemented as appropriate in hardware, computer-executable instructions, firmware, or combinations thereof. Computer-executable instruction or firmware implementations of the processor(s) 1124 may include computer-executable or machine-executable instructions written in any suitable programming language to perform the various functions described.

The memory 1118 may store program instructions that are loadable and executable on the processor(s) 1124, as well as data generated during the execution of these programs. Depending on the configuration and type of item analysis computers 1110, the memory 1118 may be volatile (such as RAM) and/or non-volatile (such as ROM, flash memory, etc.). The item analysis computers 1110 or servers may also include additional storage 1126, which may include removable storage and/or non-removable storage. The additional storage 1126 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 1118 may include multiple different types of memory, such as SRAM, DRAM, or ROM.

The memory 1118, the additional storage 1126, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 1118 and the additional storage 1126 are all examples of computer storage media. Additional types of computer storage media that may be present in the item analysis computers 1110 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the item analysis computers 1110. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The item analysis computers 1110 may also contain communications connection(s) 1128 that allow the item analysis computers 1110 to communicate with a stored database, another computing device or server, user terminals and/or other devices on the networks 1108. The item analysis computers 1110 may also include I/O device(s) 1130, such as a keyboard, a mouse, a pen, a voice input device, a touch input device, a display, speakers, a printer, etc.

Turning to the contents of the memory 1118 in more detail, the memory 1118 may include an operating system 1132, one or more data stores 1134, and/or one or more application programs or services for implementing the features disclosed herein including an item module 1136, subset module 1138, interaction module 1140, electronic marketplace module 1142, and/or presentation module 1144. The modules may be software modules, hardware modules, or a combination thereof. If the modules are software modules, the modules will be embodied on a computer readable medium and processed by a processor in any of computer systems described herein.

The item module 1136 may be configured to determine one or more items (e.g., one or more items from an plurality of catalog items, an entire item catalog, etc.). For example, the items may be identified during a browsing session, when the user accesses an item detail page for an item, when the user provides a search query for the item, and other interactions with one or more items. In some examples, the items may be identified or accessed by one or more systems and provided to the item module 1136 in one or more data files.

The subset module 1138 may be configured to generate a subset of catalog items from a plurality of catalog items. For example, when the user browses to ten items, the subset module 1138 may be configured to identify three to six of those ten items for presentation and/or analysis. The items may be substitutes for each other (e.g., the user would either purchase A, B, or C, if the user purchases any item of A, B, or C, etc.). Items in the subset may be filtered, sorted, or analyzed, as discussed throughout the disclosure.

The subset module 1138 may also be configured to determine item comparisons. For example, the items that a user interacts with may be included in the subset of catalog items. In another example, the items in the subset may include all items a user interacts with, less items that do not exceed a threshold (e.g., at least half the users interact with item C if they also interact with items A and B, etc.).

The interaction module 1140 may be configured to identify user activity data (e.g., reflecting catalog item viewing events, etc.) and/or user interaction data (e.g., including acquisition events, selection events, etc.). For example, a user may search for an item, browse through item results, add an item to an electronic shopping card, order or purchase an item, or other interactions discussed herein.

Information associated with the item module 1136, interaction module 1140, and any other modules discussed herein may be stored with one or more data stores 1134 or systems (e.g., a data storage system that stores user activity data reflective of catalog item viewing events and catalog item acquisition events of each of a plurality of users of an electronic catalog, a data mining system operative to analyze the user activity data reflective of the catalog item viewing events and catalog item acquisition events, a server system operative to incorporate the comparison data into catalog pages of the electronic catalog in association with catalog items, etc.).

The electronic marketplace module 1142 may be configured to provide an electronic marketplace. For example, the electronic marketplace may provide one or more network pages (e.g., item detail page, recommendation page, etc.) to present items for users that are provided by one or more merchants. The user may purchase the item displayed by the network page.

The presentation module 1144 may be configured to provide information and/or item data for presentation to a user. For example, the information may include information about a subset of items. Various types and implementations of the presentation are illustrated throughout the disclosure, including at FIGS. 2-7.

Figure 12:
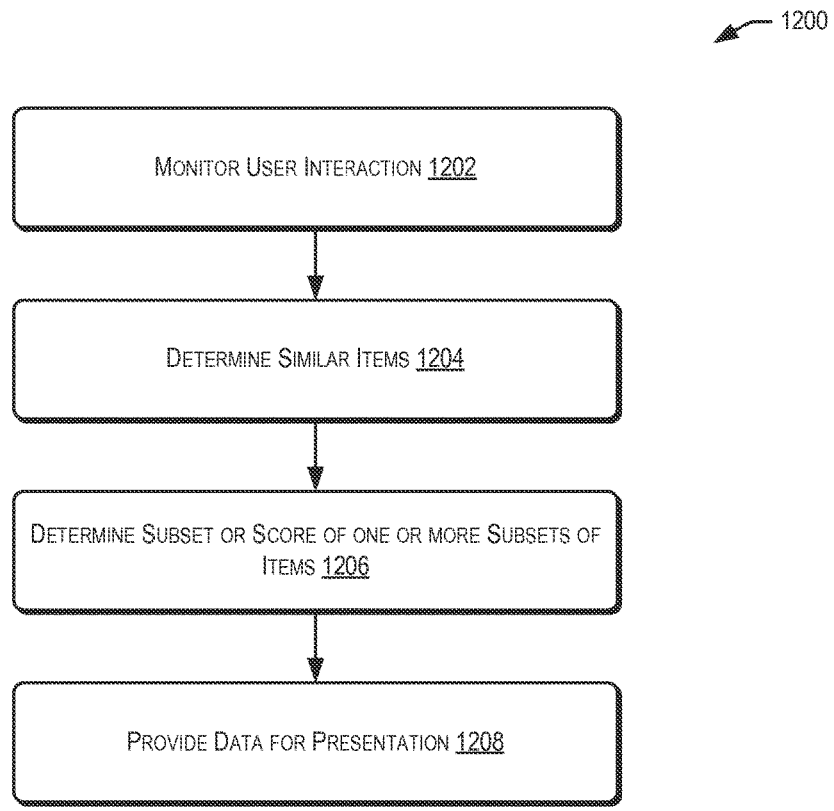
FIG. 12 illustrates an example flow determining multiple item comparisons described herein, in accordance with at least one embodiment.

FIG. 12 illustrates an example flow determining multiple item comparisons described herein, in accordance with at least one embodiment. In some examples, the one or more item analysis computers 1110 (e.g., utilizing at least one of the item module 1136, subset module 1138, interaction module 1140, electronic marketplace module 1142, and/or presentation module 1144) or one or more user devices 1104 shown in FIG. 11 may perform the process 1200 of FIG. 12.

Some or all of the process 1200 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 1200 may begin at 1202 by monitoring user interactions. For example, the item analysis computers 1110 can monitor user interaction of a plurality of users with an electronic marketplace. The user interaction may include viewing information about items and ordering items. In some examples, the user interaction can include clickstream data for the plurality of users (e.g., with the electronic marketplace, etc.).

At 1204, similar items may be determined. For example, the item analysis computers 1110 can determine a competing category of items that compete for a user order. The competing category of items may include one or more items associated with the competing category of items, such that ordering a first item in the competing category of items lowers a probability that the user will also order a second item in the competing category of items.

In another example, the item analysis computers 1110 can determine a comparison set of three or more items considered by users prior to making an ordering decision with respect to an item. The comparison set can be based at least in part on the user interaction of the plurality of users with the electronic marketplace.

At 1206, a subset or score of one or more subsets of items may be determined. For example, the item analysis computers 1110 can determine a compared subset of the competing category of items. The compared subset can contain at least three items of the competing category of items that were both viewed and ordered by users. In another example, the item analysis computers 1110 can determine a score for each item in the comparison set based at least in part on user viewing and ordering statistics for the three or more items in the comparison set.

User viewing and ordering statistics may include various information. For example, the user viewing and ordering statistics may include a ranking of the items that are viewed most/least often, rate at which items are purchased or ordered, a conversion rate associated with one or more items (e.g., if viewed, how often does a user purchase the item, etc.), competition rankings, frequency of interaction, or other methods. In some examples, the item analysis computers 1110 may implement known viewing or ordering statistical algorithms to help determine a subset or score of one or more items and/or user viewing and ordering statistics (e.g., maximum likelihood, Tobin's model, Friedman test, etc.).

At 1208, data may be presented for presentation. For example, the item analysis computers 1110 can provide item data, information, or controls about the compared subset for presentation to a user. In another example, the item analysis computers 1110 can provide information about the compared subset for presentation to a user.

Illustrative methods and systems for determining multiple item comparisons are described above. Some or all of these systems and methods may, but need not, be implemented at least partially by architectures such as those shown at least in FIGS. 1-12 above.

Figure 13:
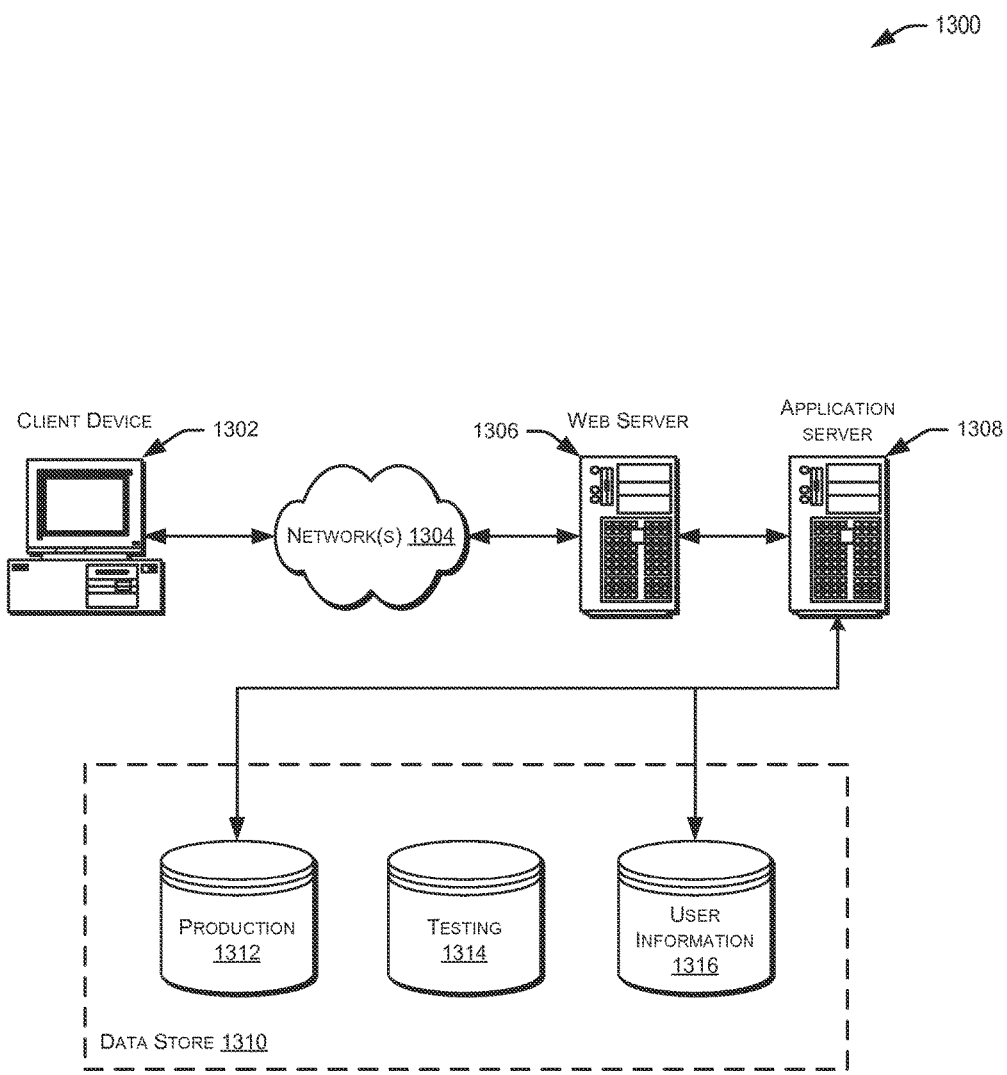
FIG. 13 illustrates an environment in which various embodiments can be implemented.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computing system for analyzing user activity data reflective of catalog item viewing events and catalog item acquisition events to compare multiple items from an electronic catalog, comprising:
    at least one data storage system that stores the user activity data reflective of the catalog item viewing events and the catalog item acquisition events of each of a plurality of users of the electronic catalog provided at least in part by an electronic marketplace;
    at least one processor in a data mining system in communication with the at least one data storage system operative to analyze the user activity data reflective of the catalog item viewing events and the catalog item acquisition events, and based thereon:
        to generate a subset of catalog items of a plurality of catalog items, the subset of catalog items comprising at least a first catalog item, a second catalog item, and a third catalog item, and to generate comparison data for the subset of catalog items, the comparison data at least approximately indicating how frequently users, who view the first catalog item, the second catalog item, and the third catalog item, select the first catalog item to acquire over the second catalog item and the third catalog item, select the second catalog item to acquire over the first catalog item and the third catalog item, and select the third catalog item to acquire over the first catalog item and the second catalog item, wherein the comparison data is determined based at least in part by identifying the subset of catalog items comprising at least the first catalog item, the second catalog item, and the third catalog item that are considered during a same browsing session at least above a browsing frequency threshold; and a server system operative to incorporate the comparison data into catalog pages of the electronic catalog in association with catalog items to which the comparison data corresponds, the server system thereby enabling users to consider the comparison data in selecting catalog items to acquire, the catalog pages indicating a portion of users who (i) viewed the first catalog item, the second catalog item, and the third catalog item and (ii) previously ordered exactly one item of the subset of catalog items.

2. The computing system of claim 1, wherein the data mining system is operative to generate the comparison data at least partly by:

identifying a plurality of sessions in which both (1) the first catalog item, the second catalog item, and the third catalog item were viewed, and (2) one of the catalog items was selected to acquire; and when a number of sessions falls below a significance threshold, the comparison data for a next subset of items is accessed.

3. The computing system of claim 2, wherein the data mining system is further operative to generate a percentage value reflective of how frequently the first catalog item was selected over the second catalog item and the third catalog item in the plurality of sessions, and the server system is operative to incorporate the percentage value into an item detail page corresponding to the second catalog item or the third catalog item.

4. The computing system of claim 1, wherein the data mining system is operative to give different non-zero amounts of weight to different ones of a plurality of sessions in generating the comparison data.

5. The computing system of claim 1, wherein the catalog item acquisition events include a purchase of the first catalog item, the second catalog item, or the third catalog item from the electronic marketplace.

6. A computer-implemented method comprising:

monitoring user interaction of a plurality of users with an electronic marketplace, the user interaction including viewing information about items and ordering items;

determining a competing category of items that compete for a user order of one or more items associated with the competing category of items, such that ordering a first item in the competing category of items lowers a probability that the user will also order a second item in the competing category of items;

determining a compared subset of the competing category of items, the compared subset containing at least three items of the competing category of items that were both viewed and ordered by users, wherein the determination of the compared subset of the competing category of items is based at least in part by identifying co-browsed sets of the at least three items that are viewed during a same browsing session at least above a browsing frequency threshold; and providing information about the compared subset for presentation to a user, the information indicating a portion of users who (i) viewed the at least three items and (ii) previously ordered exactly one item of the at least three items.

7. The computer-implemented method of claim 6, wherein the compared subset contains at least three and no more than five of the competing category of items that were both viewed and ordered by users.

8. The computer-implemented method of claim 6, further comprising determining a ratio for the compared subset by dividing a number of users who purchased one of the compared subset by a number of users who viewed the compared subset.

9. The computer-implemented method of claim 8, wherein the information about the compared subset provided for presentation to the user includes information corresponding to the ratio.

10. The computer-implemented method of claim 6, wherein the user interaction of the plurality of users includes clickstream data for the plurality of users with the electronic marketplace.

11. The computer-implemented method of claim 6, further comprising:

providing item data, information, or controls about a hero item, wherein the hero item is not included with the monitored user interactions.

12. One or more computer-readable storage media collectively storing computer-executable instructions that, when executed by one or more computer systems, configure the one or more computer systems to collectively perform operations comprising:

monitoring user interaction of a plurality of users with an electronic marketplace, the user interaction including viewing information about items and ordering items;

determining a comparison set of three or more items considered by users prior to making an ordering decision with respect to an item, the comparison set of three or more items based at least in part on the user interaction of the plurality of users with the electronic marketplace, wherein the determination of the comparison set of three or more items is based at least in part by identifying co-browsed sets of the three or more items that are viewed during a same browsing session at least above a browsing frequency threshold;

determining a score for each item in the comparison set based at least in part on user viewing and ordering statistics for the set of three or more items in the comparison set; and providing information about the comparison set for presentation to a user, the information indicating a portion of users who (i) viewed the set of three or more items and (ii) previously ordered exactly one item of the set of three or more items.

13. The one or more computer-readable storage media of claim 12, wherein the scores for each item in the set of three or more items in the comparison set are determined independent of user viewing and ordering statistics for items outside of the comparison set.

14. The one or more computer-readable storage media of claim 12, wherein determining the score for each item comprises dividing a number of users who purchased one of the comparison set by a number of users who viewed the comparison set.

15. The one or more computer-readable storage media of claim 12, the operations further comprising:

limiting interaction data from the monitored user interactions from the determination, wherein the limitation includes (1) the user did not consider A, B, and C within a selected time interval, (2) the user considered a threshold number of views between considering A, B, and C, (3) the user made an intervening purchase after considering one item and before considering others, and/or (4) the ultimate selection of A, B, or C occurred more than a threshold amount of time after the item is viewed.

16. The one or more computer-readable storage media of claim 12, wherein the presentation includes an item comparison page that includes comparison data for the comparison set of three or more items.

17. The one or more computer-readable storage media of claim 12, wherein the presentation is an interactive page in which one or more of the set of three or more items is selectable.

18. The one or more computer-readable storage media of claim 17, further comprising:

when the selection is received, presenting comparison data that compares the selected catalog item to the other items in the compared comparison set.

19. The one or more computer-readable storage media of claim 12, wherein the comparison set of three or more items contains at least three and no more than six items that were both viewed and ordered by users.

20. The one or more computer-readable storage media of claim 12, further comprising:

providing information about a hero item, wherein the hero item is not included with interaction data from the monitored user interactions for the plurality of users.

* * * * *